(12) United States Patent
 Heijkens

(10) Patent No.: US 11,607,612 B2
(45) Date of Patent: Mar. 21, 2023

(54) CONTROLLING A USER INTERFACE

(71) Applicant: KING.COM LIMITED, St. Julians (MT)

(72) Inventor: Mick Heijkens, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 17/349,227

(22) Filed: Jun. 16, 2021

(65) Prior Publication Data
 US 2022/0401839 A1    Dec. 22, 2022

(51) Int. Cl.
 *A63F 13/537*    (2014.01)
 *A63F 13/69*    (2014.01)

(52) U.S. Cl.
 CPC ............ *A63F 13/537* (2014.09); *A63F 13/69* (2014.09)

(58) Field of Classification Search
 CPC ........ A63F 13/537; A63F 13/69; A63F 13/56; A63F 13/57; A63F 13/55; A63F 13/577
 See application file for complete search history.

(56) References Cited

U.S. PATENT DOCUMENTS

| | | | | |
|---|---|---|---|---|
| 2014/0081438 A1* | 3/2014 | Knutsson | ............. | A63F 13/822 |
| | | | | 700/92 |
| 2014/0235338 A1* | 8/2014 | Hansson | ............... | A63F 13/533 |
| | | | | 463/31 |
| 2016/0089602 A1* | 3/2016 | Frostberg | .............. | A63F 9/0612 |
| | | | | 463/31 |
| 2017/0216724 A1* | 8/2017 | Delgado | ................. | A63F 13/46 |
| 2022/0226730 A1* | 7/2022 | Dicken | ................... | A63F 13/60 |

OTHER PUBLICATIONS

AppTipper, "Candy Crush Jelly Saga Level 50", Jan. 15, 2016, Youtube.com, at https://www.youtube.com/watch?v=3TnCvpQTWkk &t=28s (last visited Jul. 22, 2022), pp. 1-14. (Year: 2106).*

* cited by examiner

*Primary Examiner* — Steve Rowland
(74) *Attorney, Agent, or Firm* — Saul Ewing LLP

(57) ABSTRACT

A computer device configured to provide a game to a user and to implement a special game element. A gameboard comprising gameboard locations is rendered on a display. A first set of the gameboard locations comprise tiles supporting game objects, and at least one of the gameboard locations does not comprise a tile. A user input selecting one of user selectable game elements supported by the tiles is received, and the device detects match game conditions. At least one tile of the gameboard supports a special game element, which is activated or triggered when a special game element triggering condition is detected. On detection of the special game element triggering condition, The special game element is triggered to cause it to move to a target gameboard location. If there is no tile at the target gameboard location a new tile is generated on the gameboard at the target gameboard location.

20 Claims, 17 Drawing Sheets

CONTROLLING A USER INTERFACE

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

A particular challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic game board comprising tiles supporting user selectable game elements. The player then has to match three or more of the same type of game element on the game board and those matched elements then disappear. In a switcher game, the player switches place of adjacent game elements on the game board so that one or both of them create a chain of at least three adjacent game elements of the same type. Those matched game elements then disappear. The game board is then repopulated with game objects.

Another existing game-type is a "clicker game." A "clicker game" is a type of casual puzzle game where the player is required to find patterns on a seemingly chaotic board. The player then has to match two or more of the same type of game element on the game board and those matched elements are then removed from the board. The player matches adjacent game elements of the same type by selecting one or more of the game elements in a group of matching elements.

A further existing game-type is a "linker game." In this game, the user aims to remove game elements from the gameboard by linking groups of three or more matching elements. The user can select the elements to link by, for example, dragging their finger over the elements on a touch screen and then releasing their finger to select the linked element. Alternatively, the user may click on the elements they wish to link and then actively select a completion button to trigger their selection.

In games of the above type of game mechanic, certain game elements are provided on tiles which have additional properties compared with "normal" game elements which can be switched (clicked/linked) and are then removed. Such game elements are often referred to as booster game elements (or simply 'boosters') because they enhance game play, for example they may be triggered, and when triggered they remove additional game elements from the game board according to different removal policies associated with different booster game elements. Booster elements include for example line blasters, column blasters, bombs, fish etc.

The game also implements several different kinds of so called "blockers". Blockers (also referred to herein as blocking elements) are game elements that are in the way for the player when wanting to make matches on different areas of the gameboard. Blocking elements are unresponsive to direct user engagement, but may be removed in certain conditions. Blocking elements may be removed by making a match adjacent a blocking element, or by the action of a booster game element which has been triggered.

Some blocking elements may be multi-layer blocking elements. These blockers have a predefined number of layers which the user has to remove in order to remove the whole blocker from its supporting tile. A single layer is removed from the multi-layer blocker when a match-3 condition is satisfied adjacent to the multi-layer blocker, or when a triggered booster element acts on the blocker. For such blockers, the blocking element is only removed fully when the final layer of the blocker is removed from the gameboard, when a blocking element removal condition is satisfied.

The blocking element removal condition may be satisfied if the blocking element comprises a last layer of a multi-layer blocking element, the other layers of the blocking element having previously been removed from the gameboard in one or more prior blocking element layer removal condition.

Some blocking elements may be unresponsive to element matches and other events that would otherwise cause removal of an element or a layer thereof from a gameboard. Such blockers may also be referred to herein as indestructible walls, or non-removable walls.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

In existing games, a gameboard layout is presented to a user at the commencement of each level of a game with which a user is to engage. The layout of a gameboard is defined in gameboard level data. Each gameboard comprises multiple gameboard locations which may be arranged in a rectangular array, or in any other conveniently displayable form for a user to engage with the gameboard. In some gameboards, all gameboard locations may be associated with a gameboard tile, capable of supporting a user selectable gameboard element or some other kind of game element such as a booster or blocker. In some gameboards, a set of gameboard locations may support such gameboard tiles, but the gameboard may also comprise one or more gameboard location which represents a hole or void, at which no tile is located. Gameboard layouts with holes or voids can present interesting challenges for a user who is engaging with the gameboard and attempting to make matches. When a refill mechanism is implemented in such gameboards, only the gameboard locations at which there are gameboard tiles are repopulated with game elements. Holes or voids do not support game elements, and thus are not populated when a refill mechanism is implemented to repopulate the remainder of the gameboard.

The present inventor has recognised that there are certain situations where the existence of holes or voids may be frustrating to a player, and prevent a player from attaining an objective associated with the gameboard level with which he is engaging. Accordingly, the present inventor has devised a new computer device which is configured by game code to support the creation of new tiles in a gameboard layout responsive to activation of a tile creation game element.

According to an aspect of the invention, there is provided a computer device configured to provide a game to a user, the computer device having:

a user interface comprising a display and configured to provide on the display a gameboard comprising gameboard locations, at least a first set of the gameboard locations comprising tiles supporting game objects, wherein at least some of the game objects are user selectable game elements of differing characteristics and wherein at least one of the gameboard locations does not comprise a tile, the user interface configured to detect user input when a user engages with one of the user selectable game elements; and a processor configured to receive a detected user input with one of the user selectable game elements and detect a qualifying match game condition of a plurality of adjacent user selectable game elements having matching characteristics, and configured to remove the plurality of user selectable game elements of the qualifying match game condition when a qualifying match game condition is detected and to generate new user selectable game elements to replenish the gameboard;

wherein at least one tile of the gameboard supports a special game element, and wherein the processor is further configured to detect a special game element triggering condition and on detection of the special game element triggering condition to trigger the special game element to cause it to move to a target gameboard location, to detect that there is no tile at the target gameboard location and to generate a new tile on the gameboard at the target gameboard location.

The target gameboard location may be the gameboard location adjacent the tile supporting the special game element.

The processor may be configured to cause the special game element to move to another gameboard location, to detect that a tile at the other gameboard location supports a user selectable game element and to remove that user selectable game element from the tile at the other gameboard location.

In some embodiments, at least one tile of the gameboard supports a stopper element and wherein the processor is configured to detect that the special game element has reached the tile supporting the stopper element and to prevent the special game element from moving to another gameboard location. In such an embodiment, the processor may be configured to remove the special game element from the gameboard when it is detected that the special game element is located at the tile supporting the stopper element. The processor may be configured to remove the stopper element from the gameboard when it is detected that the special game element has reached the tile supporting the stopper.

The processor may be configured to generate a dynamic visualisation when the special game element moves from its supporting tile to the target gameboard location.

The processor may be configured to detect the special game element triggering condition when a qualifying match game condition is detected in which any of the tiles supporting the user selectable game elements of the qualifying match condition are adjacent the tile supporting the special game element.

The processor may be configured to detect the special element triggering condition when a booster element support by a tile on the gameboard activated by the user input engages with the special game element.

In some embodiments, the special game element may comprise multiple layers and the processor may be configured to remove one of the multiple layers on detection of a special game element layer removal condition. In such an embodiment, the processor may be configured to detect the special game element triggering condition when all layers of the multiple layers of the special game element have been removed.

In some embodiments, the tile supporting the stopper further supports a user selectable game element.

In some embodiments, the tile supporting the stopper further supports a selectable game element.

In some embodiments, the computer device may comprise computer memory holding a data structure which identifies gameboard locations without tiles and which, for each tile, indicates a tile attribute defining the user selectable game object supported by that tile. In such an embodiment, the processor may be configured to update the data structure to add the generated new tile with a corresponding tile attribute.

In some embodiments, the processor may be configured to generate an impact effect on detection that the special game element has reached the tile supporting the stopper, the impact effect removing a user selectable game element from at least one target tile associated with the impact effect.

In some embodiments, the processor may be configured to remove a blocker game element from the tile at other gameboard location.

In some embodiments, the data structure defines a path for movement of the special game element.

According to another aspect of the invention, there is provided a method of controlling a computer device responsive to user input, the method comprising:

providing on a display of the computer device a gameboard comprising gameboard locations, at least a first set of the gameboard locations comprising tiles supporting game objects, wherein at least some of the game objects are user selectable game elements of differing characteristics, wherein at least one of the gameboard locations does not comprise a tile, and wherein at least one tile of the gameboard supports a special game element;

detecting user input when a user engages with one of the user selectable game elements; and receiving a detected user input with one of the user selectable game elements and detecting a qualifying match game condition of a plurality of adjacent user selectable game elements having matching characteristics, removing the plurality of user selectable game elements of the qualifying match game condition when a qualifying match game condition is detected and generating new user selectable game elements to replenish the gameboard;

the method further comprising detecting a special game element triggering condition and on detection of the special game element triggering condition to trigger the special game element to cause it to move to a target gameboard location, detecting that there is no tile at the target gameboard location and generating a new tile on the gameboard at the target gameboard location.

According to another aspect of the invention, there is provided non-transitory computer readable media on which are stored computer readable instructions which when executed by a processor of a computer device cause the processor to implement the method of claim 19. In some embodiments, the computer readable media may be transitory.

According to another aspect of the invention, there is provided a computer device configured to provide a game to a user, the computer device having:

a user interface comprising a display and configured to provide on the display a gameboard comprising gameboard locations, at least a first set of the gameboard locations comprising tiles supporting respective game objects, wherein at least some of the game objects are user selectable game elements of differing characteristics, the user interface configured to detect user input when a user engages with one of the user selectable game elements; and a processor configured to receive a detected user input with one of the user selectable game elements and detect a qualifying match game condition of a plurality of adjacent user selectable game elements having matching characteristics, and configured to remove the plurality of user selectable game elements of the qualifying match game condition when a qualifying match game condition is detected and to generate new user selectable game elements to replenish the gameboard;

wherein at least one tile of the gameboard supports a special game element, and wherein the processor is further configured to detect a special game element triggering condition and on detection of the special game element triggering condition to trigger the special game element to cause an impact effect to be generated at a target tile which is different to the least one tile which supports the special game element.

BRIEF DESCRIPTION OF THE DRAWINGS

For a better understanding of the present invention and to show how the same may be carried into effect, reference will now be made by way of example to the accompanying drawings in which.

DETAILED DESCRIPTION OF THE INVENTION

The present disclosure provides a computer device configured to provide a game to a user and in particular to provide a special game element in the context of a matching game, such a switcher, clicker or linker. The game has a gameboard with gameboard locations, some of which have tiles and some of which do not—instead they are 'voids' or 'holes'. The status of game board locations is defined in a gameboard layout, which may be for example part of level data for a game level stored in computer memory. The special game element is referred to as a 'basher' element herein. The computer device has a processor which is configured to detect a basher element triggering condition and to trigger the basher game element to cause it to move to a target gameboard location. The basher element has a number of features which may be implemented alone or in combination.

In a tile creation feature, the processor is configured to detect that there is no tile at the target gameboard location and to generate a new tile on the gameboard at the target gameboard location. In this way an updated gameboard layout is generated while the user is engaging with a particular game level.

In a game element destruction feature, the processor is configured, to detect that a tile at the target gameboard location supports a user selectable game element and to remove that user selectable game element from the tile.

In stopper feature at least one tile of the gameboard supports a stopper element and when the basher game element has reached that tile supporting it does not move any further. A path may be defined in the level data between the basher element and the stopper element, the path having one or more gameboard locations.

In an impact feature, game elements supported by one or more target tile associated with the stopper tile may be removed when the basher game element reaches the stopper element.

The terms user and player are used interchangeably throughout this document and no specific meaning is intended using one or the other unless the context suggests otherwise.

Figure 1:
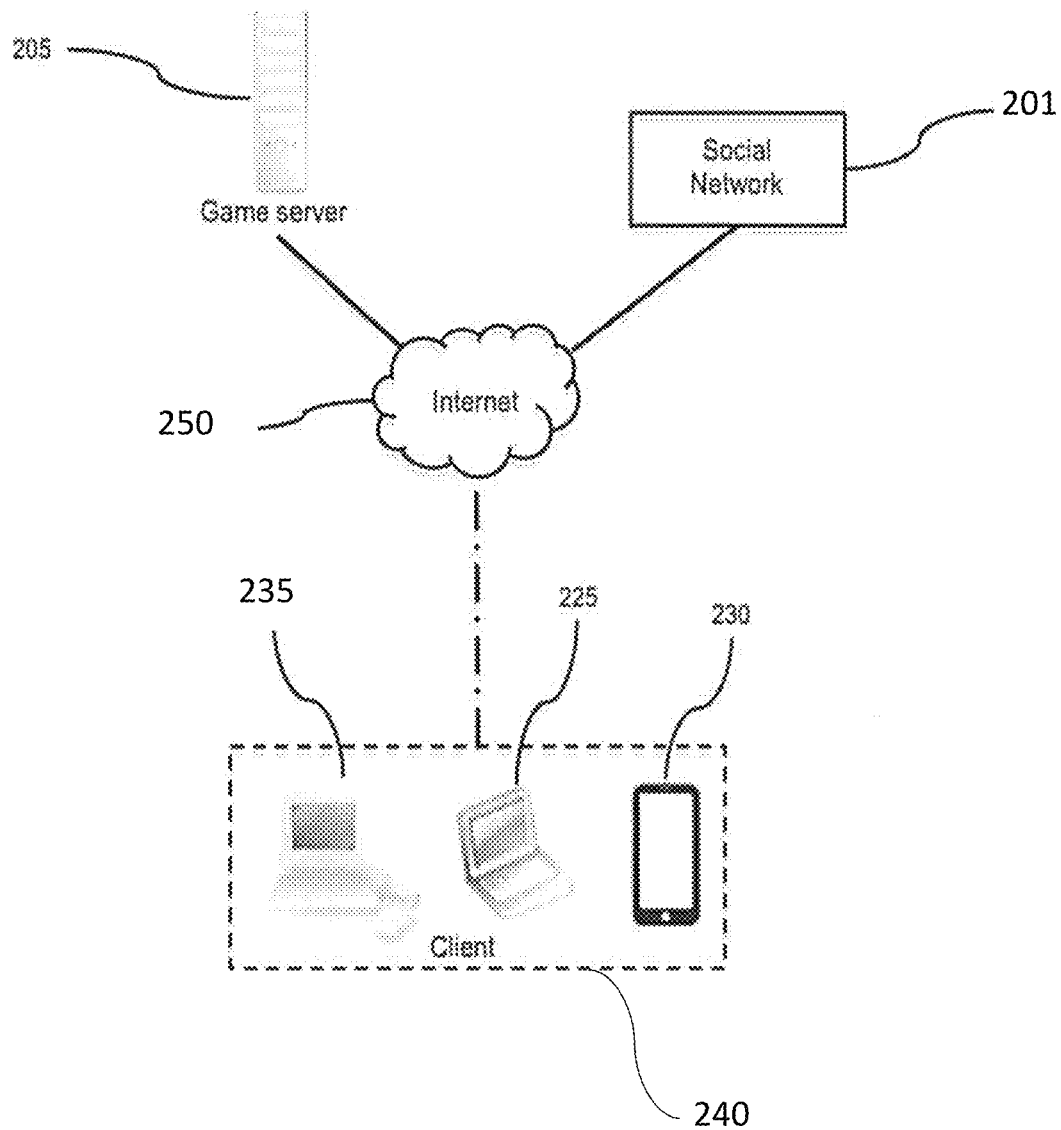
FIG. 1 shows a highly schematic diagram of a computer system architecture.

FIG. 1 portrays an exemplary overall environment in which the computer device of the present invention can be utilized as a client device. A virtual game is stored on, for instance, a game server 205. The virtual game is to be played on the client device 240, such as a computer 235, 225 or a smartphone or other handheld device 230. The client device 240 can also be a kiosk, arcade gaming station, smart TV or other device with computing capabilities, input devices, and a screen that can present the game to a user. The client device communicates with the game server 205 and a social network server 201, for instance through the Internet 250 or other network. It should be understood that the social network server 201 and the game server 205 do not have to be located in different places, they could be on the same server or on a plurality of servers located in different locations. People skilled in the art will understand that other devices than the exemplary ones listed can also be used without departing from the scope of the invention.

The computer device may have a user interface allowing a user to interact with it in different ways depending on the capabilities of the client device 240 which the user is accessing the game with. A user can interact with the game through using a touch screen where the user can select and/or move elements on the game board with a finger or for instance with a stylus. The game can also be played with a pointing device such as a mouse or other interaction devices such as keyboard while the game is displayed to a user on a separate display of the user interface.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 2:
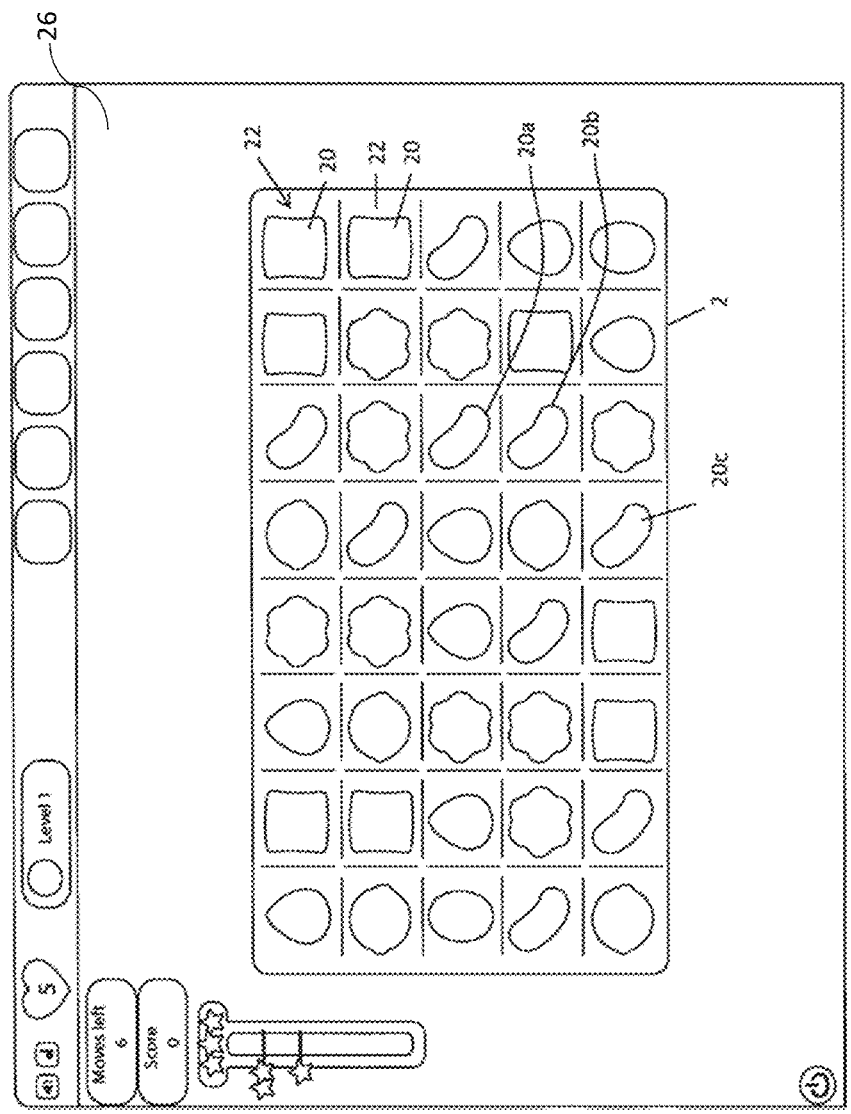
FIG. 2 is a graphical representation of a level in the Candy Crush game.

FIG. 2 shows a display of a known version of a match 3 switcher game called Candy Crush Saga™. FIG. 2 illustrates a game board 2 with a plurality of game elements 20 provided on a user interface 26 of a computer device. The game elements are each of six different shapes and colours. Each game element is supported by a tile 22. In some embodiments, the tiles are not readily visible to a player of the game—the game elements are the main focus for a player. However, the tiles govern characteristics of the game elements which are visible to a player as will be described in more detail later.

Figure 3:
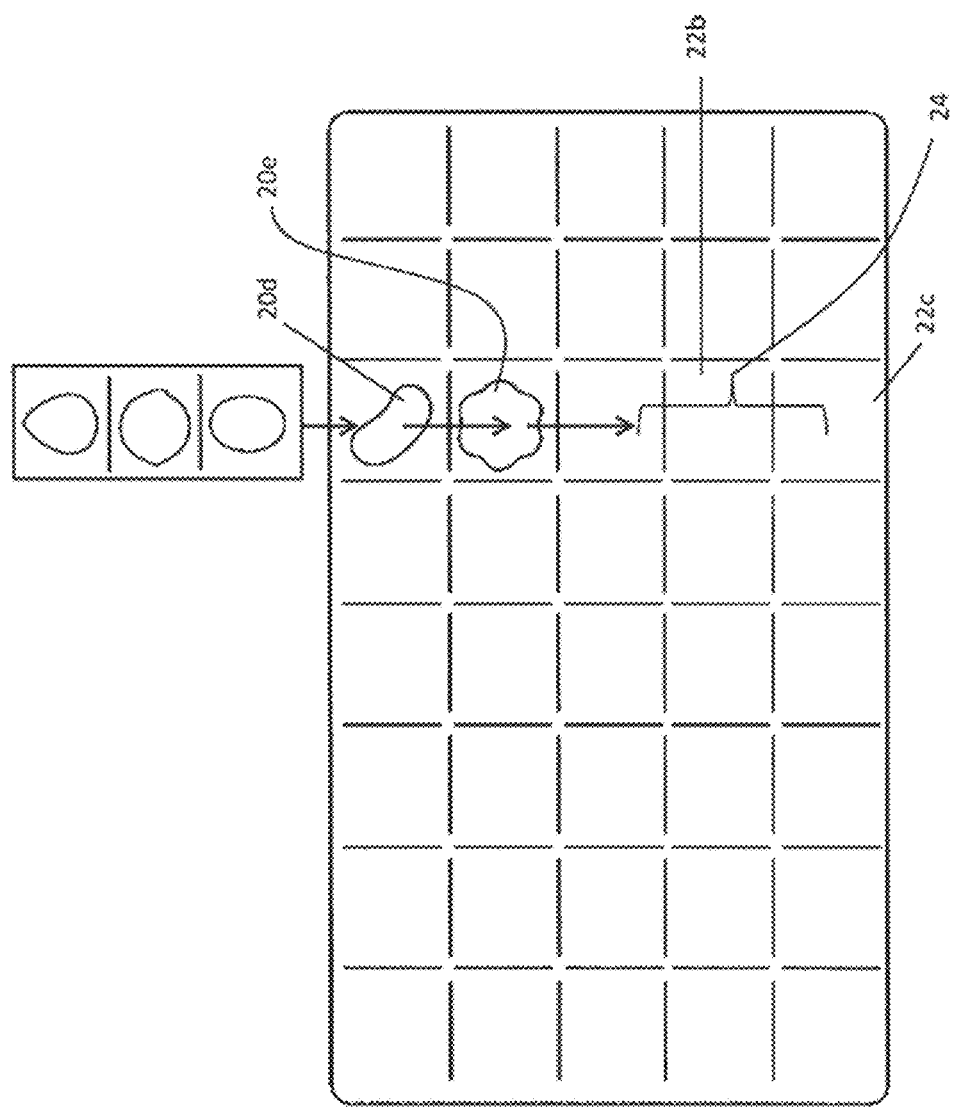
FIG. 3 shows a graphical representation of an exemplary gameboard, demonstrating a refill procedure.

In the known version of the match 3 switcher game, the aim of the game is to swap game elements in the shape of candies with each other to make moves on the game board. To gain points the player has to make moves that create matches of at least three of the same candy. In doing so, the player gains points and the matched candies are removed. As a result, new candies are generated to fill any vacancies created. New candies may for example appear to fall in place from the top of the gameboard, but other effects are possible. Assume in FIG. 2 that game element 20c is moved one place to the right to form a three-line match with game elements 20a and 20b. Turning now to FIG. 3, this has the effect of game board elements 20a, 20b and 20c "disappearing", creating a visual effect (animation) on the screen to indicate the disappearance, such as a minimal explosion effect denoted 24 in FIG. 3. The two game elements which were directly above game elements 20a will now fall downwards into the spaces created by the removal of game elements 20a, 20b and 20c. Thus, game element 20e will end up at the location of tile 22c, and game element 20d will end up at the location of tile 22b. In addition, three new game elements are generated and fall downwards into the game board to fill the remaining three tiles above tile 22b. In existing games, the newly generated game elements may be generated at random. The user then has a new game board on which to play a subsequent move. Note that in this case, the new game board has the same gameboard layout, but is populated by new game elements. Game elements may be of different types, and may include so-called booster game elements which enhance game play for a user. As explained more fully herein, the present disclosure relates to a computer device which is configured to provide further ways in which gameplay may be enhanced for a user by modifying the game board layout itself during game play.

The computer device and its operating modes described herein can be deployed in many different gameplay architectures. For example, a computer device can be configured by a computer game executed on the device. The game may be implemented as a computer program (e.g. game code) that is stored locally in the memory of a PC, games console, tablet or mobile telephone or other computing device. The game can be implemented as a computer program that is stored and runs entirely on one of many processors in a remote server, and data streams or updates are supplied to the client device (e.g. tablet, smartphone, etc.) to enable the client to render and display graphics and sounds.

Another possible infrastructure is a hybrid one, in which back-end servers handle some elements of the gameplay, and for instance a Java game applet is provided to client devices and it is the locally running Java applet that configures the client device to generate the graphics/sounds/user interaction for gameplay on the player's client device. Some data may be fed back to the back-end servers to enable scoring, interaction with other players and cross-platform synchronisation.

In implementations where some or all elements of game code are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

Figure 4:
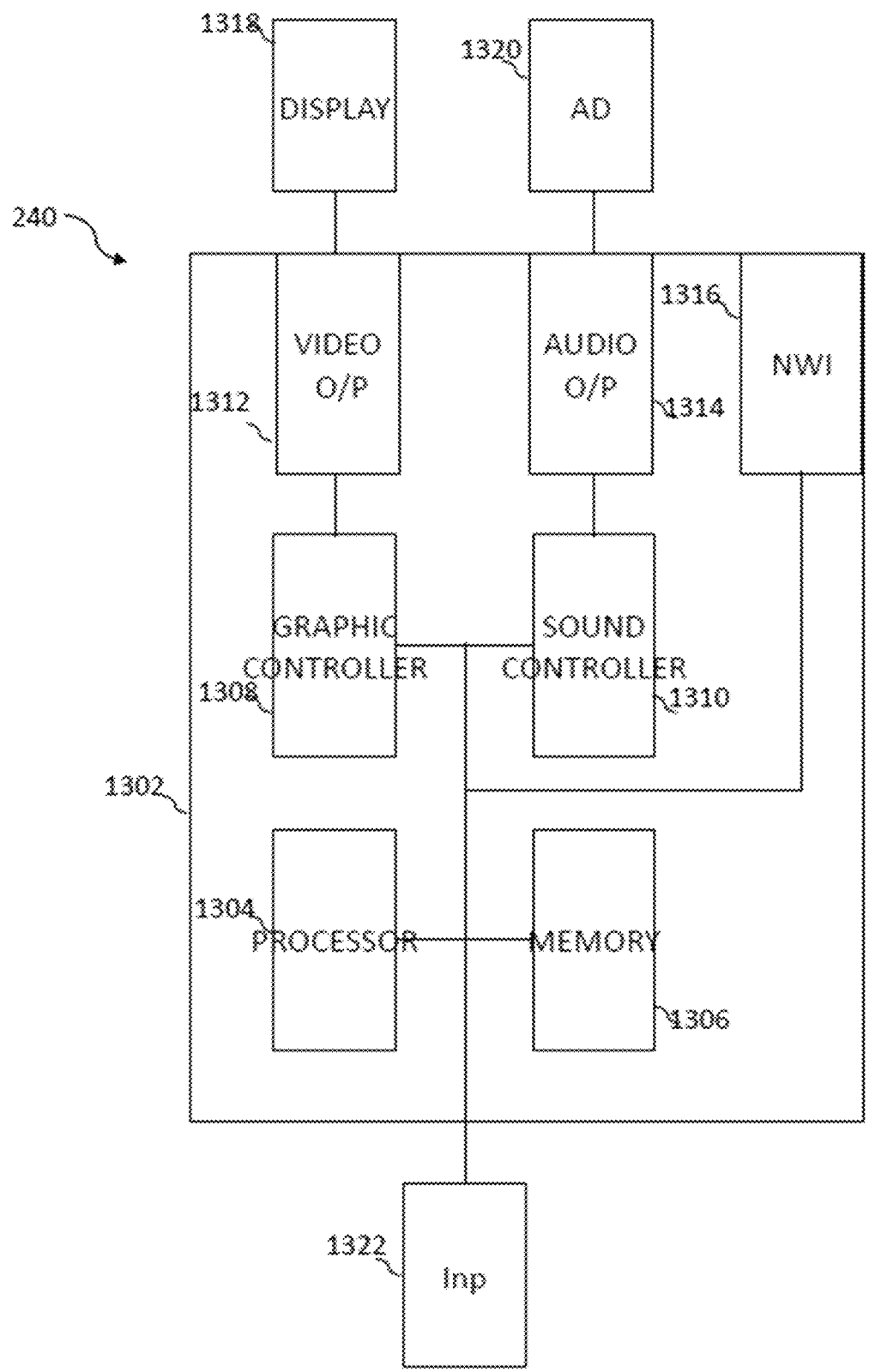
FIG. 4 shows a highly schematic diagram of a computing device.

A schematic view of the user or computing device 240 according to an embodiment is shown in FIG. 4. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional components may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of: a keyboard, mouse, touch screen, joystick or game controller. It should be appreciated that the display 1318 may in some embodiments also provide the input device 1322, for example, by way of an integrated touch screen. The functional components of the controller 1302 are configured to communicate with each other via an interconnect such as a bus or any other suitable interconnect and/or by point to point communication.

It should be appreciated that, in some embodiments, the controller 1320 may be implemented by one or more circuits, at least in part. It should be appreciated that embodiments may be deployed in different system architectures. For example, the computer device may be configured by a computer game that is stored in the memory 1306 of the user device 240. However, when online, the server 205 may handle some elements of the game in some embodiments, as previously described.

In some embodiments, a computer game may be implemented as a computer program that is stored in a memory system, for example the server 205, and which runs on the processor of the game server. Data streams or updates are supplied to the client device 240 to allow the user device 240 to render and display graphics and sounds in a browser of the client device 240.

Figure 5:
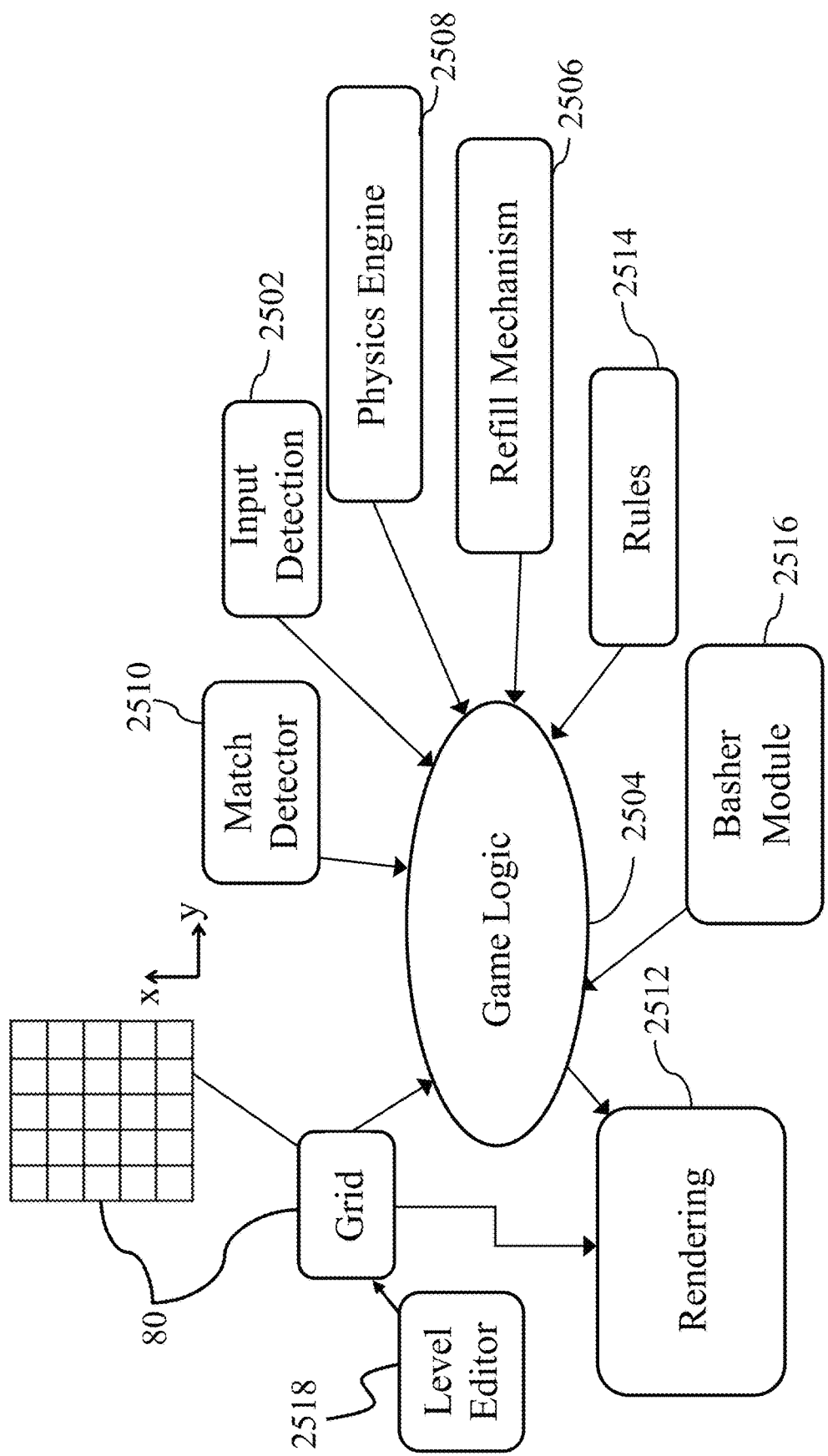
FIG. 5 is a highly schematic diagram of computer related architecture to implement a Basher element feature.

FIG. 5 shows a schematic representation of the functional components of an embodiment of a computer device configured to implement a "Basher" functionality as described herein. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. Note that the term 'blocks' is used interchangeably herein to denote game elements or game objects. The game logic 2504 processes the information provided by the user input. The game logic 2504 may then determine if a valid selection has been made, and what the outcomes of the selection should be.

The rendering component is used to render the gameboard 2 to the user. It renders the game elements on the gameboard 2. Each time a game element moves tile location, for example, during a switch to make a match in a switcher game, or in gameboard refill, the rendering block is used to render this movement visible to the user on the display 1318 of the user device 240.

Figure 6:
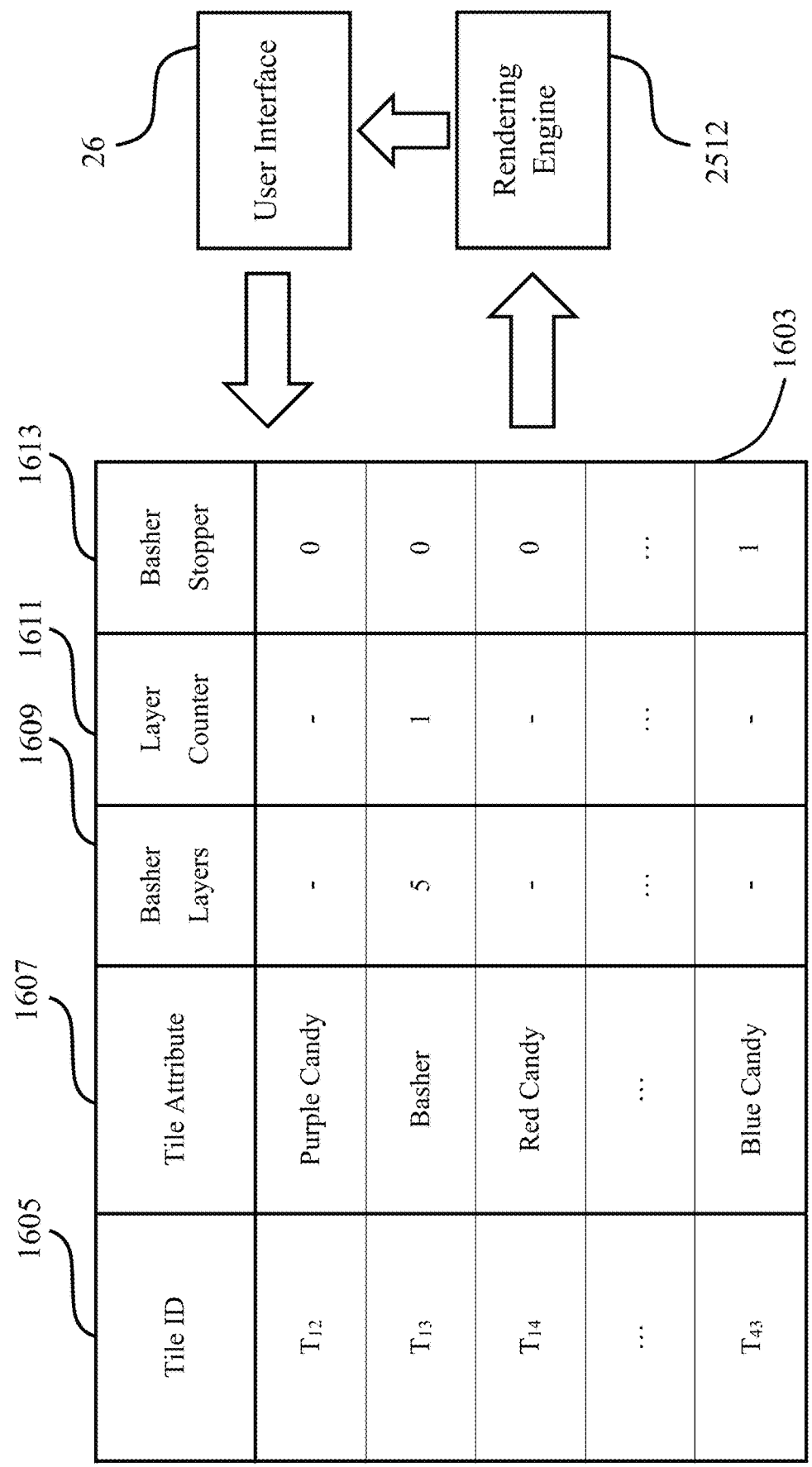
FIG. 6 shows a data structure comprising tile data and Basher data for a level.

The grid component 80 stored in a memory provides a grid representation of the game board as shown schematically in FIG. 5. The grid component can be supplied by any suitable data structure, held in a local memory or remote memory accessible by the device, and is responsible for providing the game board layout. For example, the grid component may be supplied by a level data module 2518, as described later herein. As further described herein, the game board layout for each game level comprise game board locations, some of which may define tiles and other of which may define voids or holes, where there is no tile. The grid component identifies each tile location on the game board and holds tile data including a tile ID and associated attributes about the game object supported by that tile and displayed at that tile location. For example, the grid component 80 may include data structures such as that of FIG. 6, the data structure comprising data pertaining to tiles and their attributes, and data pertaining to basher elements and their implementation. FIG. 6 is described in more detail later. These associated attributes may then be used in combination with other components in order to control the rendering of the display, e.g. a match detector component 2510, and a refill mechanism component 2506.

Each game object has object attributes associated therewith. The terms game object and game element are used interchangeably throughout this document and no specific meaning is intended using one or the other unless the context suggests otherwise.

The object attributes may be stored in any suitable memory location. In some embodiments, the object attributes may be provided by a data structure. In some embodiments, the object attributes may be considered to be part of the game logic and in other embodiments may be considered to be outside the game logic. The object attributes may provide information as to the properties of a game object. These properties can include information of type/characteristic such as colour and/or whether or not a game object has a particular function such as a booster function or blocker function.

The game logic 2504 determines the game objects selected by a user, and the actions to follow to implement the game mechanic. The following describes an implementation using a 'switcher' mechanic where groups of 3 or more matching game objects) are created when a user switches two adjacent objects and the resulting matching adjacent objects are automatically removed. In a switcher game, whether the colour and/or shape characteristics of adjacent elements match is determined by a match check. This check may be carried out for the whole gameboard where there are game elements. All game elements on the game board are match checked against the game elements immediately adjacent to them. Alternatively, only some game elements on the gameboard are match checked. The game elements to be match checked may be determined by the location of user interaction with the gameboard, and/or the location of recent tile activity such as game element removal or game element refill. When multiple game elements are detected to have matching characteristics, a group of game elements is formed such that even game elements which are not directly adjacent to each other are included in the same group as long as they are connected in an adjacent manner via other game elements which also possess the same matching characteristic. In some embodiments, these groups of matching adjacent game elements may have to all be connected in one direction, i.e. they may have to be either vertically or horizontally connected. The match check is implemented after the player selects the two game elements to switch tile locations.

It will be appreciated that the device capable of providing the features described herein may be configured to provide a clicker game in which the qualifying match condition comprises two or more matching game elements, or a 'linker' game where game elements are dragged to form a match 3 or more condition.

The game logic controls the rules for determining if a valid match has been created for removal of the matched game elements from the gameboard. The game logic 2504 operates according to a set of rules of the level the user is playing. The game logic has access to data for each tile including its tile ID designating its location on the grid 80, and associated tile attributes providing information about the contents of that tile, e.g. the game object within that tile, at least one characteristic associated with the game object within the tile. The game logic 2504 is thus able to determine the game elements to be removed from those respective tiles for each user selection.

The physics engine component 2508 is configured to control the rendering of moving game objects in the display. The physics engine 2508 may be part of the game logic 2504.

A basher module 2516 is configured to implement a basher functionality, as described herein. Further, the basher module 2516 may control the game logic to allow activation of a basher element according to the rules of basher elements provided by the basher module 2516.

A level editor 2518 is a tool with which a game designer creates game levels. The level editor may receive user input defining an initial gameboard layout, level objective and other aspects of a game level. For example, a level designer may define the location of tiles, voids and an initial location of game elements within the level editor 2518. The level editor 2518 may output a file comprising computer readable instructions, including a data structure, which, when read, cause generation of a game level. The level editor 2518 thus outputs a data structure to be stored in memory of the grid component 80, providing predefined data for each level to the grid component 80, such as an initial gameboard layout. For example, the level editor 2518 may provide a predetermined layout of game elements to be placed in particular tiles of the grid, or may identify gameboard locations that are to be rendered as voids in the gameboard. The level editor 2518 may further provide data pertaining to basher elements in a level, for example, a number of basher layers. Basher layers are described in more detail later. Different levels may provide basher elements with different numbers of basher layers.

The level editor 2518 may further provide initial and end tile positions of one or more basher element. The tile at the initial tile position supports the basher element. The tile at the end tile position includes a basher stopper. In the described embodiments, a basher element may only travel in one direction once triggered, moving in that one direction along either the x or y axis of a 2-dimensional gameboard. The level editor 2518 thus defines a predetermined path to be taken by the basher element when it is triggered, starting at the initial tile and ending at the end tile comprising the basher stopper. The level editor 2518 may further provide an orientation of the basher element, and an orientation of its corresponding basher stopper, the basher element being orientated such that it faces in the direction of the corresponding basher stopper, and the basher stopper being orientated such that it faces in the direction of the corresponding basher element. In some embodiments, a basher element may take a predefined path to a corresponding basher stopper, which is not in a single direction. In such an embodiment, the level editor 2518 may provide an orientation of the basher element such that it faces in an initial direction of travel and the corresponding basher stopper may be orientated such that it faces a direction from which the corresponding basher element will enter the basher stopper. The above features of basher elements are described in more detail later.

The level editor 2518 may identify a target location for an impact effect, and a particular type of impact effect, to be assigned to a basher element, the rules of the identified type of impact effect being retrieved by the game logic 2504 from the basher module 2516 when a level is loaded. The basher module may comprise rules pertaining to one or more type of impact effect. The impact effect is discussed in more detail later.

Figure 7:
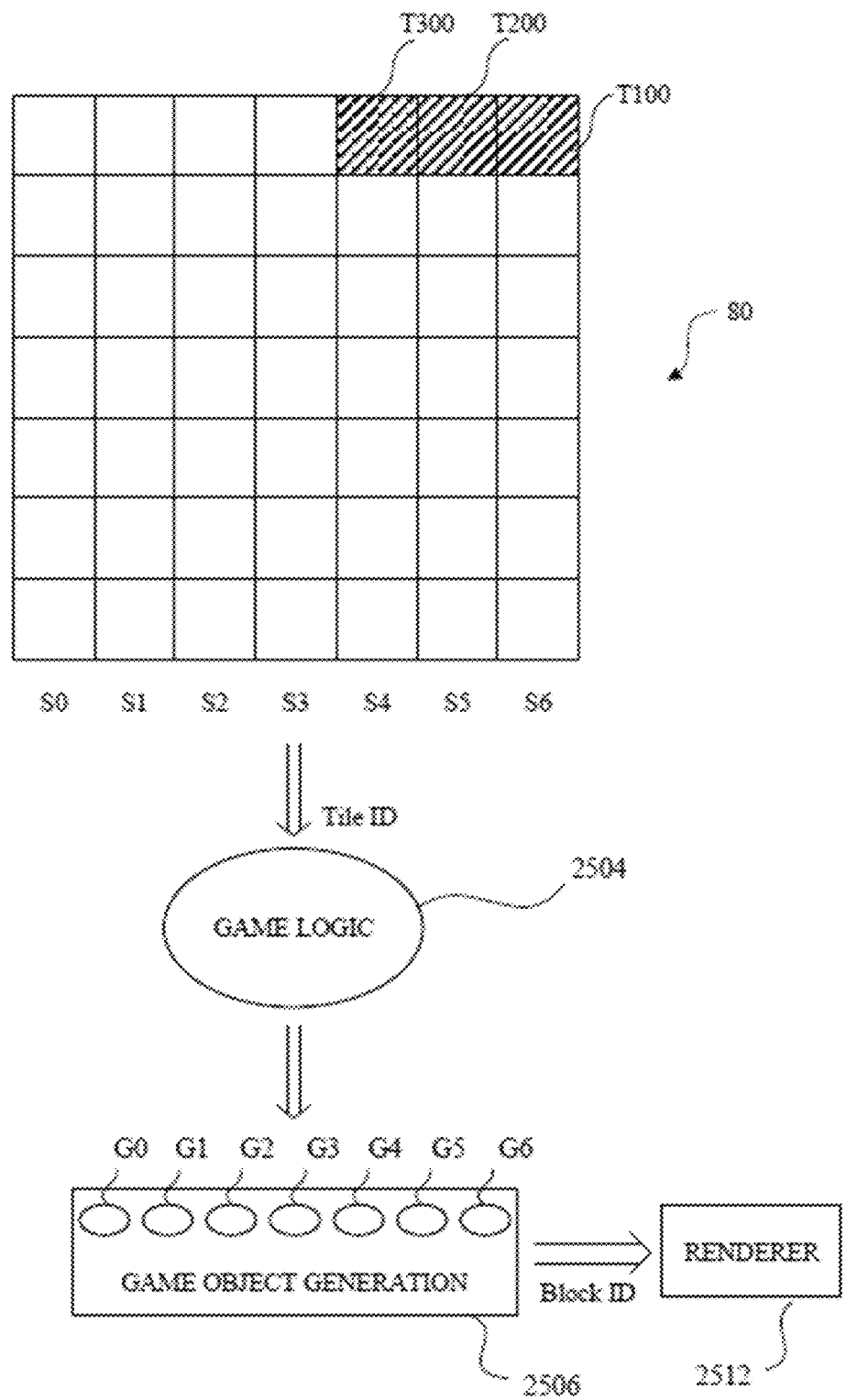
FIG. 7 is a highly schematic diagram that represents a refill mechanism.

FIG. 7 is a highly schematic block diagram illustrating how gameboards are rendered visible to the user through a normal refill process. In the normal refill, the refill process may be set to random. In fact, the random refill process may be pseudorandom. As described earlier, each game level has an initial gameboard which is a layout of gameboard locations including tiles, and, in certain embodiments described herein, voids or holes. Each tile has one or more tile attribute defined by the tile data in the initial layout. FIG. 7 shows the gameboard layout in the form of the grid 80. The grid can be considered as a map which may be used to determine the relative positions of gameboard locations on the game board from the tile ID. The grid 80 shows an array of game board locations arranged in rows and columns. In FIG. 7, the grid 80 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns.

As already explained, in order to render a gameboard on a display, each tile is associated with a game object to be rendered at that tile location. The nature of the game object, that is, for example, if it is a blocker or is playable (a normal game element or booster game element), is determined by the tile attribute(s). The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where game objects may need to be spawned to replenish the gameboard. In a normal game refill process, new game objects are spawned in tiles that have an attribute associating them with playable (user interactable) game elements. A new game element is spawned into effect at an entry point of the set. For convenience, the endmost tile (in this case T100) can be considered the entry point for S6. However, any entry point for a set can be defined, and the precise entry point may depend on the orientation or shape of the set. Game objects are spawned into sets at their respective entry points. If the tile below the entry point is vacant, the spawned game object is moved down to that tile and then a further game object is spawned above it at the entry point. Note that sets may be of different configurations and spawned game objects may be moved to vacant tiles according to different refill physics.

Each tile of the grid 80 may be associated with data to indicate a status, such as filled or unfilled (empty/vacant) in relation to game elements. Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular game objects. This may be as the endpoint of a game element which is already in the game board and moving as a result of a game move due to the action of a physics engine 2508, or as the endpoint of a new game object entering the game board.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a game object is to be spawned. That is, the tile identifier indicates the set in which the tile belongs, and enables the entry point of the set to be indicated. This tile identifier enables the appropriate algorithm to be activated, and a game object identifier is generated by that algorithm to a renderer 2512 which controls a display 1318 on which the game board is presented to cause that game object to be inserted at the entry point. Within each set the process may be entirely deterministic. That is, game objects are provided in a predetermined sequence into the set, and moved through the set in a predetermined way. That sequence may be the same for all sets, or each set may have a different sequence. Alternatively, the game objects may be spawned in a random sequence. Randomly spawned game objects will still move through the set in a predetermined way, as dictated by the refill physics.

Each generator G0 to G6 can be controlled with a respective seed which then causes a pseudo-random sequence of game objects to be generated based on that seed.

The gameboard used in gameplay is defined by the grid 80. Attributes about the game objects occupying each tile of the grid are stored in association with the name, or ID, of the tile. This tile data may be stored in, for example, the tile data structure 1603 (see FIG. 6).

It should be appreciated that the term "gameboard location" is different to the term "tile position". A gameboard location refers to a position on the grid 80, but does not necessarily refer to a tile position; empty gameboard locations may be referred to as "holes" in the grid 80. A tile position is gameboard location in which a tile exists, and in which a game element may exist, such as a normal element, a booster element, or a blocker. The term "tile position" may therefore be understood to denote the subset of gameboard locations in which a tile exists and for which there is a corresponding row in the tile data structure (see FIG. 6). Holes in the grid 80 may show a background when rendered on the display device. Alternatively, there may be tiles at the locations of the holes in the grid 80, but the attribute of these tiles may be holes. Game elements cannot occupy holes in the gameboard, but can fall through them. The shape of the grid may vary.

The basher functionality described herein provides improved user engagement by allowing tiles to be created at empty gameboard locations (or holes) upon satisfaction of particular criteria.

Basher elements and their implementation details are now described.

Activation

A novel computer device may be configured to implement so called "Basher elements" to improve user engagement in games such as switcher games. A basher element is a special game element located in a tile of an initial gameboard layout which is unresponsive to direct user engagement, such that a user is unable to change the tile position of a basher element in order to create a match. However, a basher element may be activated (or triggered) and removed from the gameboard upon satisfaction of one or more particular condition. When triggered, the basher element may travel from its initial tile position to a final tile position (also referred to as an end tile or stopper tile) before being removed from the gameboard, the basher element having one or more effect on the tiles or empty gameboard locations that lie between its initial tile and end tile. The basher element may only travel in one direction after being triggered, travelling one way along either axis of a 2-dimensional gameboard in a path provided by level data. However, in some embodiments the basher element may travel along a predefined path that is not in one direction. Upon reaching the end tile position, a basher element may have one or more further effect on other gameboard locations, as described later with reference to a so-called "impact effect".

Layers

Basher elements may be multi-layer elements. Basher elements may have a predefined number of layers which the user has to remove in order to trigger the basher and remove it from the gameboard. A single layer is removed from the multi-layer basher when a match-3 or greater condition is satisfied adjacent to the multi-layer basher or when a triggered booster element acts on the basher element. It will be appreciated that any other gameboard event that causes damage to a game element, such as an explosion from a wrapped candy with a range extending to the basher element may also satisfy a basher layer removal condition. The basher element is only triggered and removed from the gameboard when the final layer of the basher is removed. That is, a basher element triggering condition may be satisfied if the basher element comprises a last layer of a multi-layer basher element, the other layers of the basher element having previously been removed in one or more prior basher element layer removal condition.

The removal of a basher layer may be associated with a particular graphical animation that indicates to the user that a layer has been removed. For example, in some embodiments the displayed graphical representation of the basher element may initially have no colour, and a portion thereof may be filled with colour each time a basher element layer removal condition is satisfied until the basher element is filled with colour. In some embodiments, a basher element may be triggered on a game move that causes the element to be filled with colour. In some embodiments, the element may already be filled with colour when the element comprises one layer, and may require a further layer removal condition to be satisfied before the basher element is triggered. It will be appreciated that the second way of graphically representing basher layer removal does not imply that there are more layers to be removed. Whether the basher element is fully coloured prior to or upon activation depends only on implementation choice.

Stoppers

When triggered, a basher element travels from its initial tile position to an end tile position. In the described embodiments the end tile for a particular basher includes a basher stopper. A basher stopper may be an additional attribute of the tile it occupies, such that the tile also includes a game element that is responsive to user input, such as a normal game element or booster element, for example. However, the basher stopper itself does not change tile positions when a switch involving an element in the tile that comprises the basher stopper occurs. It will be appreciated that a basher stopper may have no impact on the function or the behaviour of the tile it occupies, and may serve only as a visual indication that the tile it occupies is the end tile for a corresponding basher element. In other embodiments, a stopper may not be visually indicated. In other embodiments, a basher element path may terminate at an edge of a gameboard.

In some embodiments, the basher element may be rendered on the display device as a snake, resembling a snake-shaped candy or gummy sweet. In such an embodiment, a basher stopper may be rendered as a basket into which the basher element enters upon reaching the end tile position. It should be noted that the basher stopper may be rendered in one of four orientations, such that the travelling basher element is shown to enter the top of the basket regardless of the direction of travel of the basher element. When a triggered basher element reaches the end tile position, the basher element and the basher stopper may be removed from the gameboard.

Destruction Effect

A triggered basher element may have one or more effect when it travels between its initial tile and end tile. For example, the triggered basher may affect gameboard locations that lie in the path taken by the basher element when it travels from the initial tile position to the basher stopper in the end tile position; one such effect is the destruction effect.

Any game element located in a tile that lies in the path of the basher is destroyed as the basher moves through the tile. In some embodiments, multi-layer blockers—or other elements that require more than one adjacent match condition or booster action to be destroyed—may be destroyed and fully removed from the game board if it lies in a tile through which the basher travels, regardless of how many layers remain. However, in some embodiments, a travelling basher element may only remove one layer from a multi-layer blocker. In some embodiments, the basher element may not be capable of destroying non-removable blocker elements, such as non-removeable walls. However, it will be appreciated that in such an embodiment, game levels may be created such that a basher element does not encounter a non-removeable wall, and thus always travels unhindered to its corresponding stopper at the end tile position.

Upon reaching the end tile position the basher element may be removed from the gameboard. In some embodiments, a new game elements is spawned at each tile on which a game element was destroyed by the basher element. The rules for spawning game elements may be provided by the game logic associated with the basher element. For example the game elements may be randomly spawned. In other embodiments, new game elements may be provided on the tiles from which the basher element removed game elements via the refill mechanism.

Creation Effect

Another effect of a triggered basher element travelling from an initial tile position to an end tile position is referred to as the creation effect. If there is one or more empty gameboard location between the initial tile and the end tile of the basher element, a tile may be created in place of the one or more empty gameboard location (or hole) as the basher element travels. New elements are spawned in the newly created tiles and become interactive features of the gameboard, following the removal of the basher element. The new elements may be spawned according to predefined rules provided by the basher module. The practical details of new tile creation are discussed later with reference to the exemplary tile data structure of FIG. 6.

Impact Effect

Upon reaching its end tile position, the basher element may have a further effect on one or more target tile position. For example, upon reaching its corresponding stopper, the basher element may have a destructive effect on the game element on the tile located immediately after the stopper in the direction of travel of the basher element; this is referred to as the impact effect. In some embodiments, the impact effect may only remove one layer from a multi-layer blocker element on the tile at the target tile position. It should be noted, however, that the impact effect of a first basher element may be capable of removing a layer and/or triggering a second basher element. In some embodiments, the destructive effect may fully remove any element affected by the impact effect, regardless of how many layers remain.

In some embodiments, more than one tile position on the gameboard may be affected by the impact effect. For example, the impact effect may have the same effect as if a colour bomb booster element were activated on the stopper tile, or may otherwise affect one or more tiles that are positioned adjacent to or near to the stopper tile. Alternatively, the tiles affected by the impact effect may be unrelated to the tile position of the stopper. It should also be noted that gameboard locations affected by the impact effect may be subject to effects other than a destructive effect. In some embodiments, the impact effect may be capable of creating new tiles via the creation effect if voids exist in gameboard locations affected by the impact effect.

It will be apparent that the impact effect may be implemented by basher elements that do not move along a defined path, or destroy game elements on tiles in their path, or create new tiles. The impact effect can be implemented by designating in an initial game board layout an impact location which is separate from the tile supporting the basher element.

FIG. 6 shows an exemplary tile data structure 1603 comprising tile data for a level of a game, which may be stored in memory and accessible to the processor. The tile data structure 1603 may provide data to a rendering engine 1600 such that the data can be used to render a game on a gameboard presented on a user interface 26. The tile data structure 1603 includes an entry for each tile on a gameboard, each tile being associated with a tile ID 1605. Each tile ID 1605 in the tile data structure 1603 may also be have an associated tile attribute 1607. The tile attribute 1607 associated with a particular tile ID 1605 may define the state of the corresponding tile on the gameboard. In the example of FIG. 6, the tile with tile ID 1605 "T14" is shown to have the tile attribute 1607 "Red Candy." Each time a user makes a move in-game, the tile data structure 1603 may be updated in accordance with any game elements that have changed tile location, been removed from the gameboard, or have been generated under the refill mechanism.

The tile data structure 1603 may also include store data pertaining to basher elements, or basher stoppers. In the example of FIG. 6, the row corresponding to tile ID T13 has the tile attribute "basher", indicating that that tile comprises a basher element. The data structure 1603 further includes basher layer data 1609 and layer counter data 1611. Note that only the rows having the basher tile attribute 1607 include entries in the basher layer data 1609 and layer counter data 1611 of the tile data structure 1603. For tiles with the tile attribute 1607 "basher", the basher layer data 1609 may include a positive integer which indicates the initial number of layers that must be removed before the basher element is activated. The layer counter data 1611 indicates how many layers remain to be removed before the basher element is activated. Therefore, the value of the layer counter 1611 can never exceed the basher layer value. At the beginning of a level, when a gameboard comprising a basher element is presented, the basher layer 1609 value equals the layer counter 1611 value. Each time an event occurs that removes a layer from the basher, the tile data structure 1603 is updated such that the layer counter 1611 value is reduced by one. Upon removal of the final layer, that is, when the layer counter 1611 has a value of zero, the basher element is activated according to the rules provided by the basher module.

As described herein, a basher element, when activated, travels between an initial tile position and an end tile position, destroying all elements that lie in tiles between the start tile position and the end tile positions. Upon activation of a basher element, the tile attribute 1607 of each tile in which an element has been destroyed is updated in the tile data structure 1603 to include the new tile attributes 1607 corresponding to the newly spawned game elements.

Further, one or more empty gameboard location may exist between the start and end tiles of the path of the basher element. When an activated basher element travels between its starting tile position and its end tile position via one or more empty gameboard location, new tile positions are created in the previously empty gameboard locations. In such a case, the tile data structure 1603 may be updated with one or more additional row, each additional row corresponding to a newly created tile position and having a newly generated tile ID 1605. For each newly created tile position, the tile data structure 1603 may also be updated to include a tile attribute 1607 corresponding to each newly spawned game element.

Each row in the tile data structure 1603 may include a binary value in a basher stopper category 1613, each binary value indicating whether its corresponding tile includes or does not include a basher stopper. In the example of FIG. 6, the tile T43 is shown to have a value "1" in the basher stopper category 1613, which indicates that the tile T43 includes a basher stopper. Note that the tile T43 also has the tile attribute "Blue Candy", but if the blue candy is switched with another game element, the basher stopper value 1613 does not move with it; only the relevant tile attributes 1607 would be updated as a result of the switch.

Figure 8:
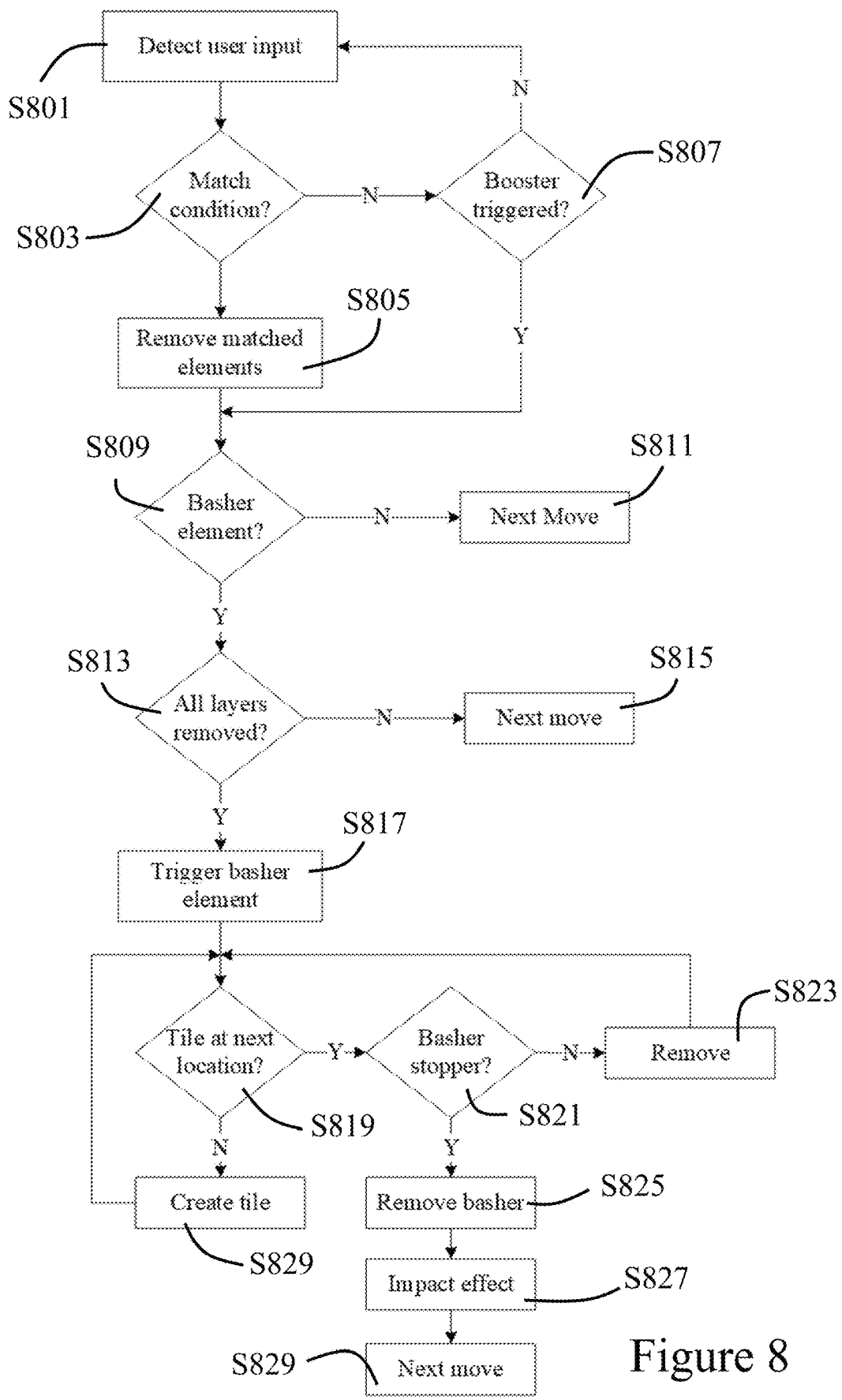
FIG. 8 is a flowchart that demonstrates a method of controlling a user device to implement a basher functionality in a switcher game.

FIG. 8 shows a flowchart that demonstrates a method of controlling a computer device responsive to user input, configured to implement a basher functionality in a match-3 game. The process of FIG. 8 begins at a step S801, wherein a user input is received via a user interface displayed on a display of a user device. In a step S803, the game logic determines whether the user input has caused a match condition to be satisfied. If a match condition is determined to be satisfied, the flow continues to a step S805, wherein the game elements comprised in the match are removed from the gameboard. The flow then continues in a step S809, which will be described later herein. If no match condition is determined to be satisfied at step S803, the flow continues to a step S807, wherein game logic determines whether the user input has caused a booster element to be triggered. If no booster element is triggered by the user input, the flow returns to step S801 and awaits further user input. If the user input has caused a booster element to be triggered, the flow continues to step S809. Note that although not shown in FIG. 8, the basher element could be triggered by a previous basher element arriving at its stopper element and causing an impact effect.

At step S809, the game logic determines whether a basher element layer removal condition is satisfied for a basher element supported by a tile of the gameboard, either by an adjacent match condition (via step S805) or triggering of a booster (via step S807). If no basher element layer removal condition is satisfied, the flow moves to a step S811 wherein the gameboard is refilled and awaits user input of a next move. If a basher element layer removal condition is satisfied, the game logic further determines whether all layers gave been removed from the basher element in a step S813. If one or more layers remain following satisfaction of the layer removal condition, the flow moves to a step S815 wherein the gameboard is refilled and awaits user input of a next move. If a final layer of the basher element is removed by satisfaction of the layer removal condition detected in step S183, the basher element is triggered in a step S817 and the basher element begins to travel to its end tile, along a predetermined path of gameboard locations.

In a step S819, the flow determines whether there is a tile in the next gameboard location through which the basher element travels. If there is a tile in the next gameboard location, the system determines in a step S821 whether the next tile comprises a basher stopper. Note that the next tile is a target tile in this context. In some embodiments, the target tile could be any other tile of the gameboard, as defined in the predetermined path which is stored in the level data. If the tile does not comprise a basher stopper, the game element supported by the tile through which the basher passes is removed. The flow returns to step S819 where the next gameboard location is queried. If, at step S821, it is determined that there is a basher stopper in the tile, the basher element, the basher stopper and the game element supported by the tile are removed from the gameboard in a step S825. The flow then moves to a step S827 wherein one or more gameboard locations is affected by the impact effect. For example, the impact effect may cause a game element in one or more tile to be removed from the gameboard, or may cause tile creation in one or more empty gameboard location. The gameboard is then refilled and awaits user input of a next move in a step S829.

If, at step S819, it is determined that there is no tile in the next gameboard location through which the basher element travels, the game logic creates a tile at the gameboard location in a step S829. The flow then returns to step S819 and the next gameboard location is queried. It will be appreciated that the steps of FIG. 8 may be carried out on a gameboard comprising one or more basher elements; one or more basher element may therefore be triggered by a single user move in a step S801, and the above steps may be performed on one or more basher element.

Figures 9A, 9B:
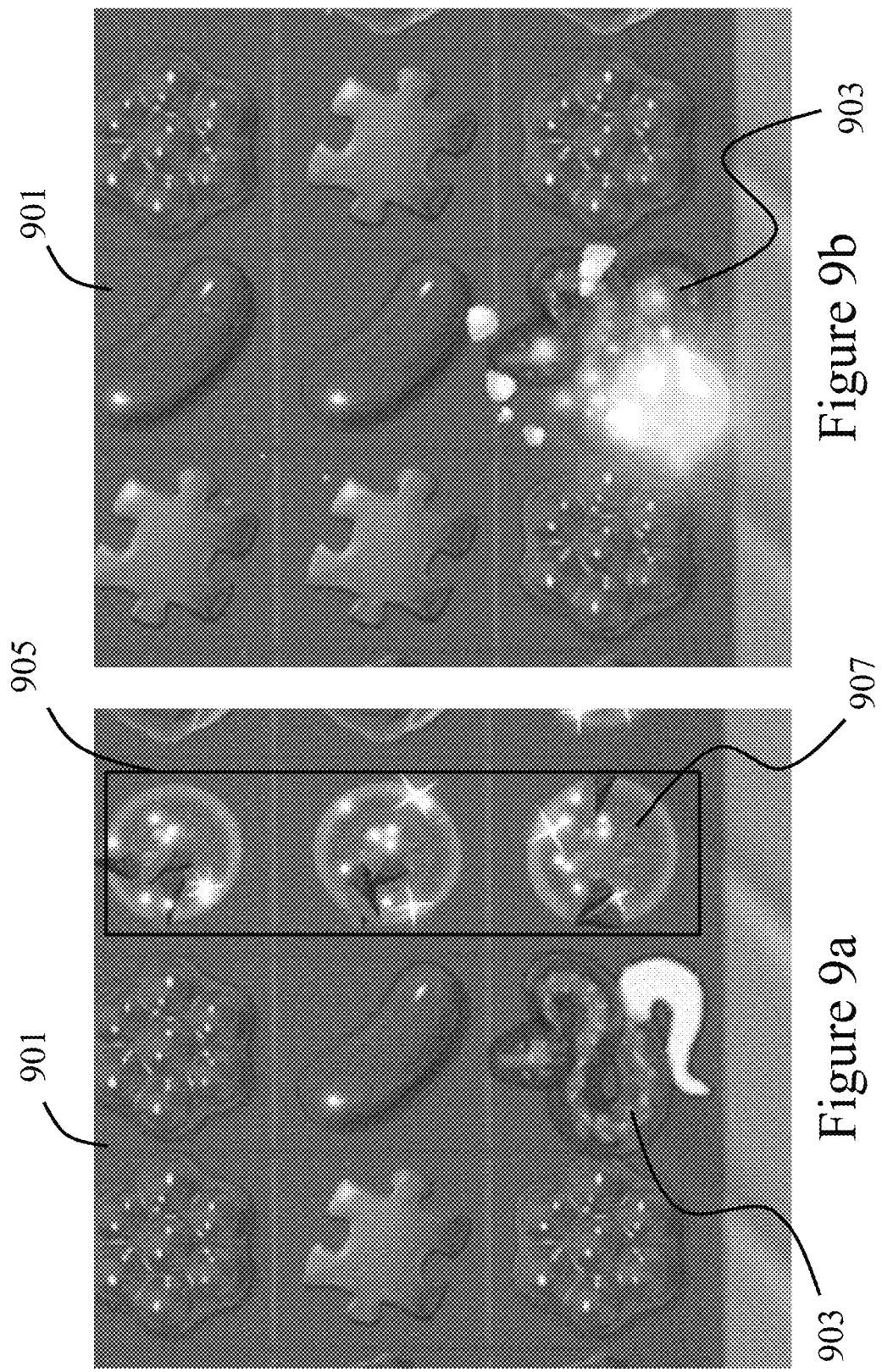
FIG. 9a shows an exemplary gameboard comprising a basher element, wherein a basher layer removal condition is satisfied.
FIG. 9b shows the same exemplary gameboard as in FIG. 9a, wherein the basher element is graphically modified to indicate removal of a layer.

FIGS. 9a and 9b show two views of an exemplary portion of a gameboard 901 in the game Candy Crush, rendered on a display of a computer device. FIG. 9a shows a basher element 903 in a vertical orientation, the basher element 903 comprising a quantity of layers. As described previously herein, a basher element 903 may provide a visual indication of the number of layers remaining. For example, the basher element 903 may initially have no texture or colour, and a portion of the basher element 903 may gain a texture or colour each time a basher layer removal condition is satisfied. In the example of FIG. 9a, the basher element 903 has two remaining layers, and thus the remaining non-textured portion of the basher element 903 represents the remaining layers that must be removed before the basher element 903 is triggered. Reference numeral 905 denotes a match of three elements, wherein the match comprises a game element 907 that is adjacent to the basher element 903; the match 905 satisfies a basher layer removal condition. FIG. 9a further shows a snapshot of the animation wherein the elements in the match 905 are removed from the gameboard 901.

FIG. 9b shows the same exemplary gameboard portion 901 as in FIG. 9a, wherein the elements matched in the match 905 have been removed from the gameboard 901, and the refill mechanism has refilled the gameboard 901. Since the match satisfies a basher element layer removal condition, a layer has been removed from the basher element 903. FIG. 9b shows a snapshot of the animation wherein a layer is removed from the basher element 903 and a further portion of the basher element 903 is visually modified, gaining a texture or colour. In the example of FIG. 9b, the basher element 903 is triggered after satisfaction of one further basher layer removal condition.

Figure 10A:
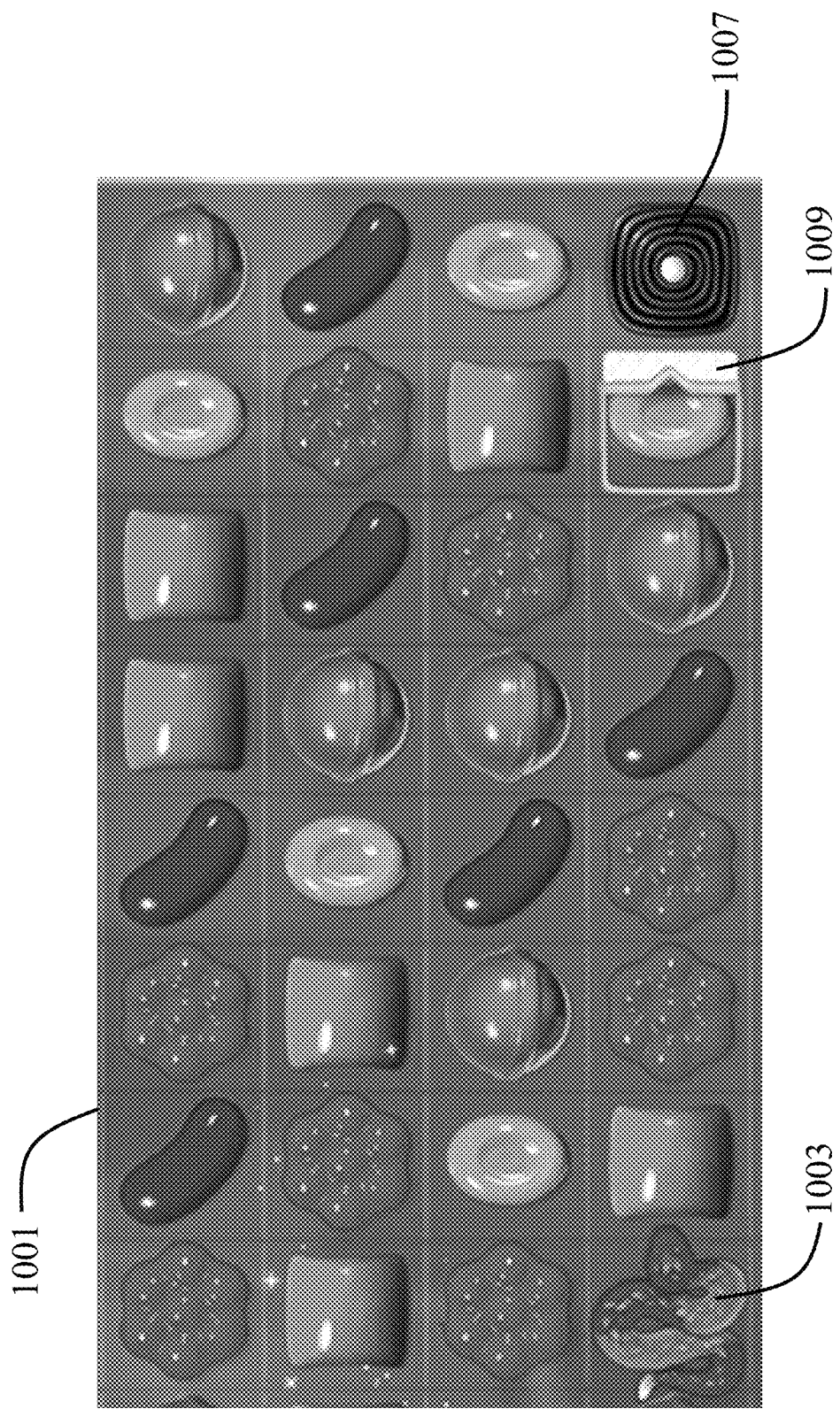
FIG. 10a shows an exemplary gameboard comprising a basher element and a basher stopper.
Figure 10B:
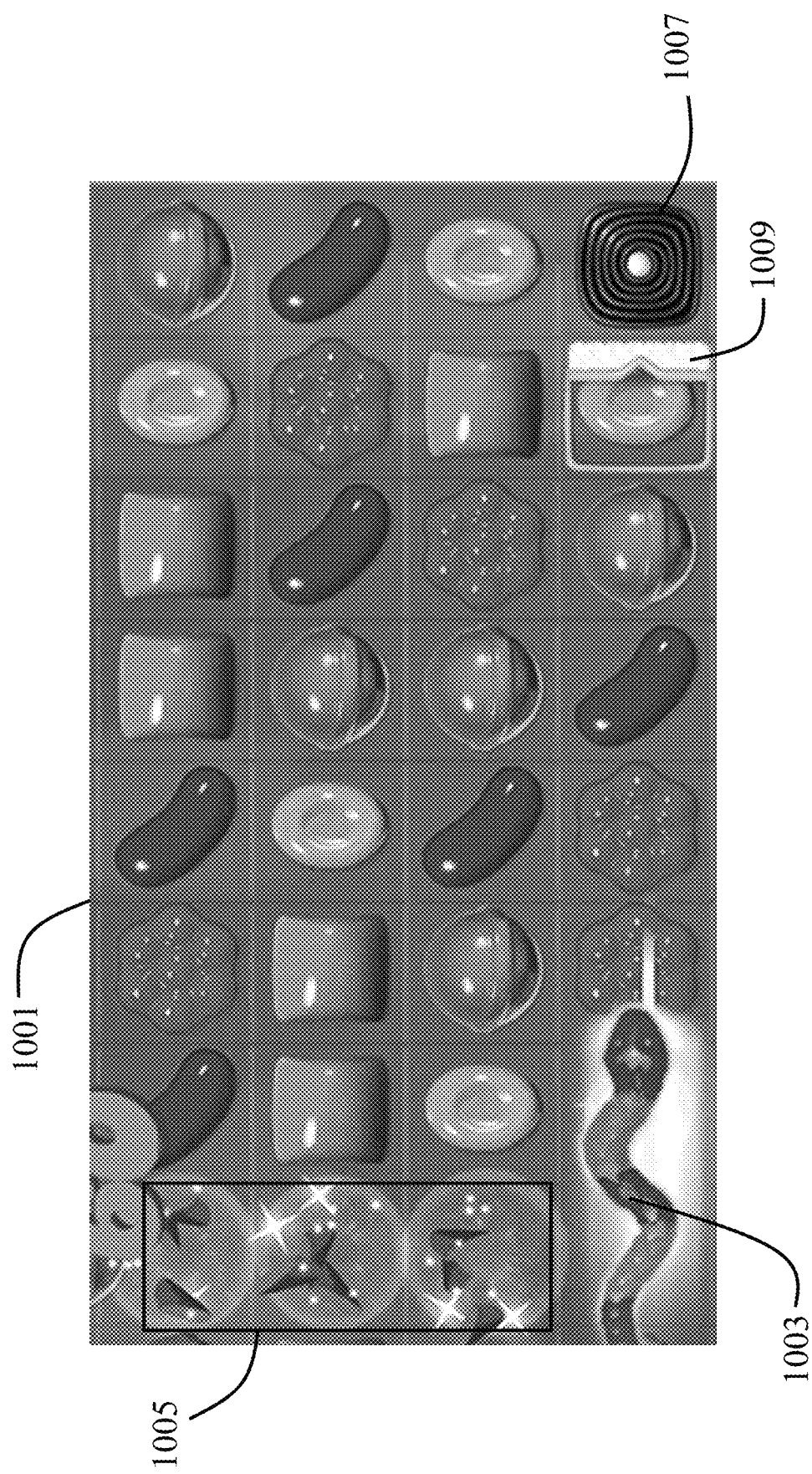
FIG. 10b shows the same exemplary gameboard as in FIG. 10a, wherein a basher layer removal condition is satisfied for a basher comprising one remaining layer.
Figure 10C:
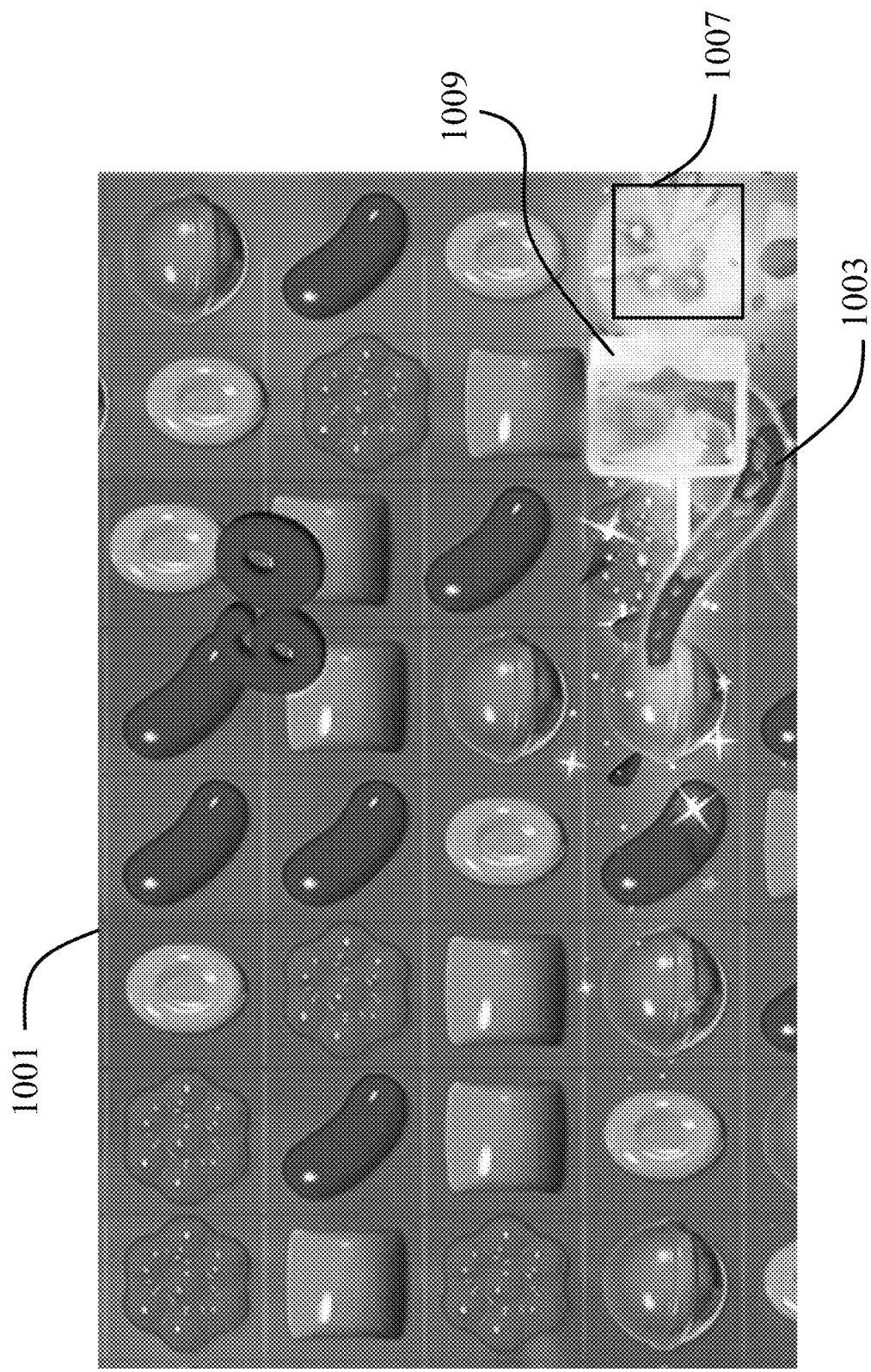
FIG. 10c shows the same exemplary gameboard as in FIG. 10b, wherein the basher element has travelled to its corresponding basher stopper and caused an impact effect.

FIGS. 10a, 10b and 10c show three views of an exemplary portion of a gameboard 1001 in the game Candy Crush, rendered on a display of a computer device. FIG. 10a shows a basher element 1003 in a horizontal orientation, the basher element 1003 comprising one layer, removal of which causes the basher element 1003 to be triggered. FIG. 10a also shows a basher stopper 1009, the basher stopper 1009 corresponding to the basher element 1003.

FIG. 10b shows the same exemplary gameboard 1001 as in FIG. 10a, wherein a match of three elements 1005 is made, one element in the match 1005 being located in a tile that is adjacent to the basher element 1003; the match satisfies a basher element layer removal condition. FIG. 10b shows a snapshot of an animation in which the elements in the match 1005 are removed from the gameboard. Also shown is a snapshot of an animation in which the basher element 1003 is triggered and begins to travel to the tile comprising its corresponding basher stopper 1009.

FIG. 10c shows the same exemplary gameboard as in FIG. 10b, wherein the basher element 1003 has travelled to its corresponding basher stopper 1009, destroying game elements comprised within tiles located between the initial and end tiles of the basher element. FIG. 10c shows a snapshot of an animation in which the basher element enters the basher stopper, after which both the basher element and its corresponding basher stopper are removed from the gameboard. FIG. 10c also visually demonstrates an embodiment of the impact effect, as described previously herein, wherein a special game element 1007 located in a tile that follows a basher stopper 1009 in the direction of travel of the basher element is removed by the basher element 1003. In the example of FIG. 10c, the tiles in which game elements have been destroyed by the basher element are refilled via the refill mechanism. It should be appreciated that in some embodiments, new game elements may instead be spawned randomly or according to rules provided by the basher module.

Figures 11A, 11B:
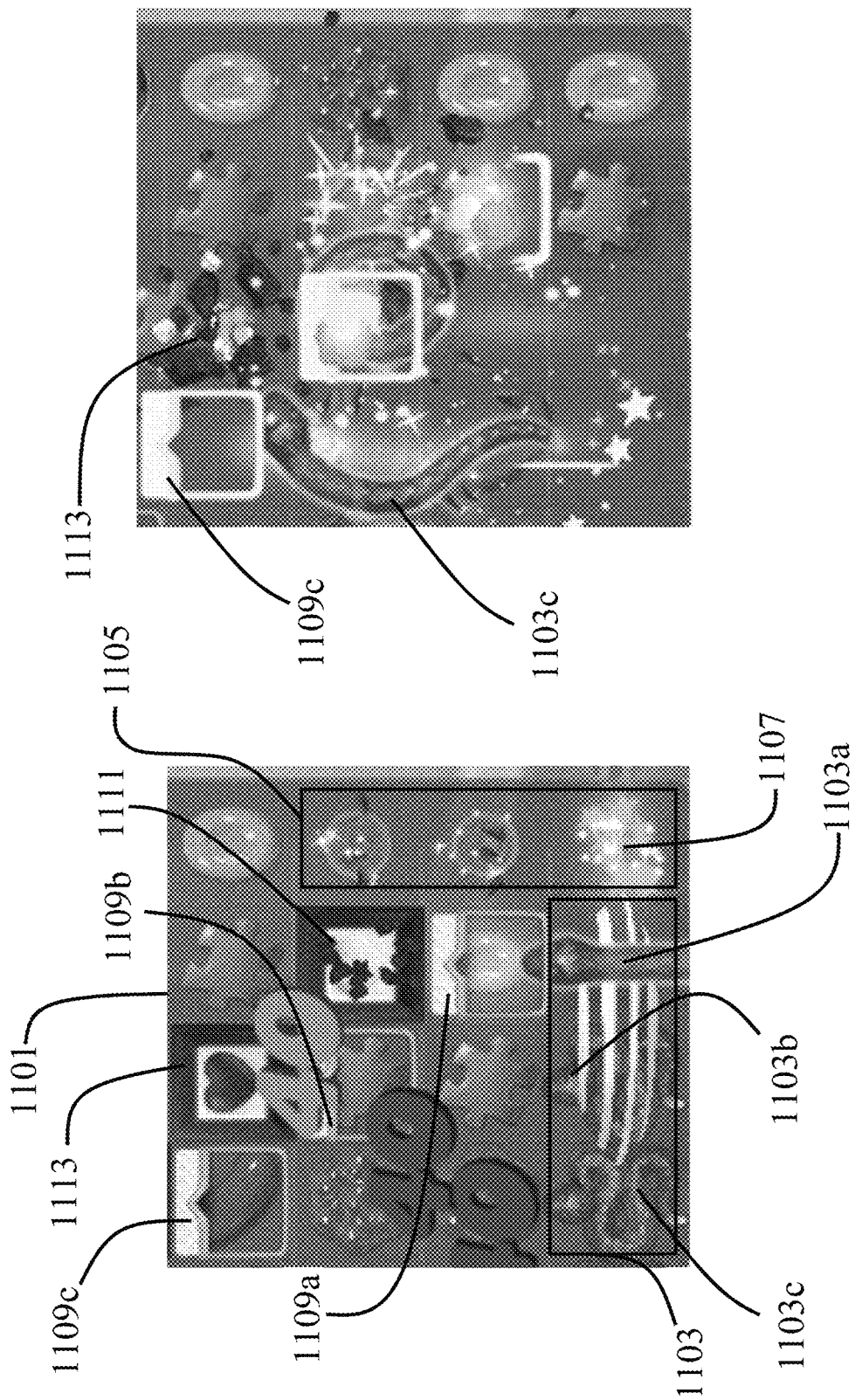
FIG. 11a shows an exemplary gameboard comprising three basher elements, the basher elements being triggered simultaneously by activation of a booster element.
FIG. 11b shows the same exemplary gameboard as in FIG. 11a, wherein the basher elements travel to corresponding stoppers and cause an impact effect on multi-layer blocker elements.

FIGS. 11a and 11b show two views of an exemplary portion of a gameboard 1101 in the game Candy Crush, rendered on a display of a computer device. FIG. 11a shows five vertically orientated basher elements 1103, each basher element 1103 comprising a quantity of layers. In the example of FIG. 11a, each basher element 1103 has one remaining layer, requiring satisfaction of one basher layer removal condition to be triggered. Reference numeral 1105 denotes a match of three elements, wherein the match comprises a line blast element, denoted 1107. FIG. 11a shows three basher stoppers 1109, which are rendered as additional attributes of tiles on the exemplary gameboard. It should be noted that all five basher elements 1103 have a corresponding basher stopper 1109, but that the portion of the gameboard 1101 shown in FIGS. 11a and 11b does not show all of the corresponding basher stoppers 1109. In the example of FIG. 11a, the basher stoppers 1109 are rendered as baskets, and in an orientation such that a corresponding basher element 1103 enters the basket from the top of the basket. Each tile that comprises a basher stopper 1109 also comprises a game element that a user can interact with. Basher stoppers 1109a, 1109b and 1109c correspond to bashers 1103a, 1103b and 1103c respectively. For example, when triggered, basher 1103c travels from its initial tile to its end tile, wherein the basher stopper 1109c is rendered.

FIG. 11a further shows a snapshot of the animation wherein the elements in match 1105 are removed from the gameboard 1101, and wherein the effect of the line blast booster element 1107 satisfies a basher layer removal condition of all five basher elements 1103 comprised in tiles in the same row as the line blast booster element 1107. Note also that a multi-layer blocker element 1111 lies in a tile adjacent to the uppermost element in match 1105. FIG. 11a shows a snapshot of an animation wherein a layer is removed from the multi-layer blocker 1111 as a result of the match satisfying a blocker element layer removal condition.

FIG. 11b shows the same exemplary gameboard portion 1101 as in FIG. 11a, wherein the elements in match 1105 have been removed from the gameboard 1101, and the refill mechanism has refilled the tiles from which the matched elements have been removed. In FIG. 11b, each basher element 1103 is shown to be travelling to its corresponding basher stopper 1109. Each basher element 1103 is also shown to be destroying all elements in the tiles that lie between the initial and end tiles of each basher element 1103. FIG. 11b also visually demonstrates an embodiment of the impact effect, as described previously herein, wherein an element in a tile that follows a basher stopper 1109 in the direction of travel of the basher element is removed by the basher element 1103. In the example of FIG. 11b, the impact effect is shown to completely destroy the elements in tiles affected by the impact effect; multi-layer blocker 1113, for example, is completely removed from the gameboard despite having more than one remaining layer. It should be appreciated that in some embodiments, the impact effect may affect different numbers or distributions of tiles, and may remove only one layer of a multi-layer element. Following removal of the basher elements 1103 and the basher stoppers 1109, the refill mechanism acts to refill tiles whose elements have been removed by the basher element or the impact effect.

Figure 12A:
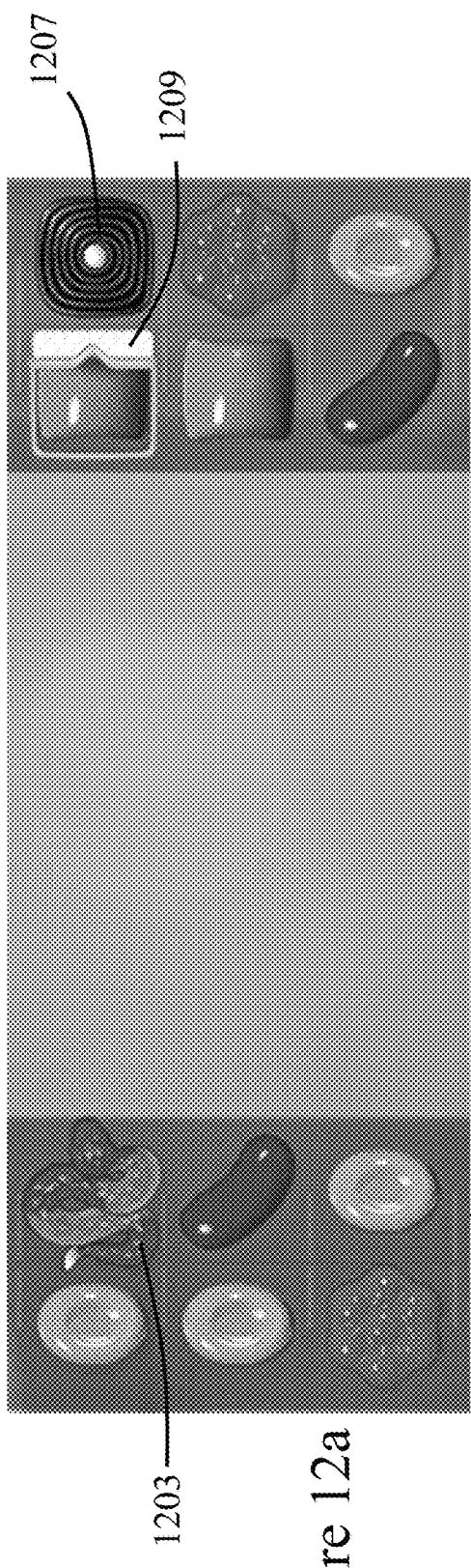
FIG. 12a shows an exemplary gameboard comprising a basher element in a horizontal orientation, the basher element having one remaining basher layer.
Figure 12B:
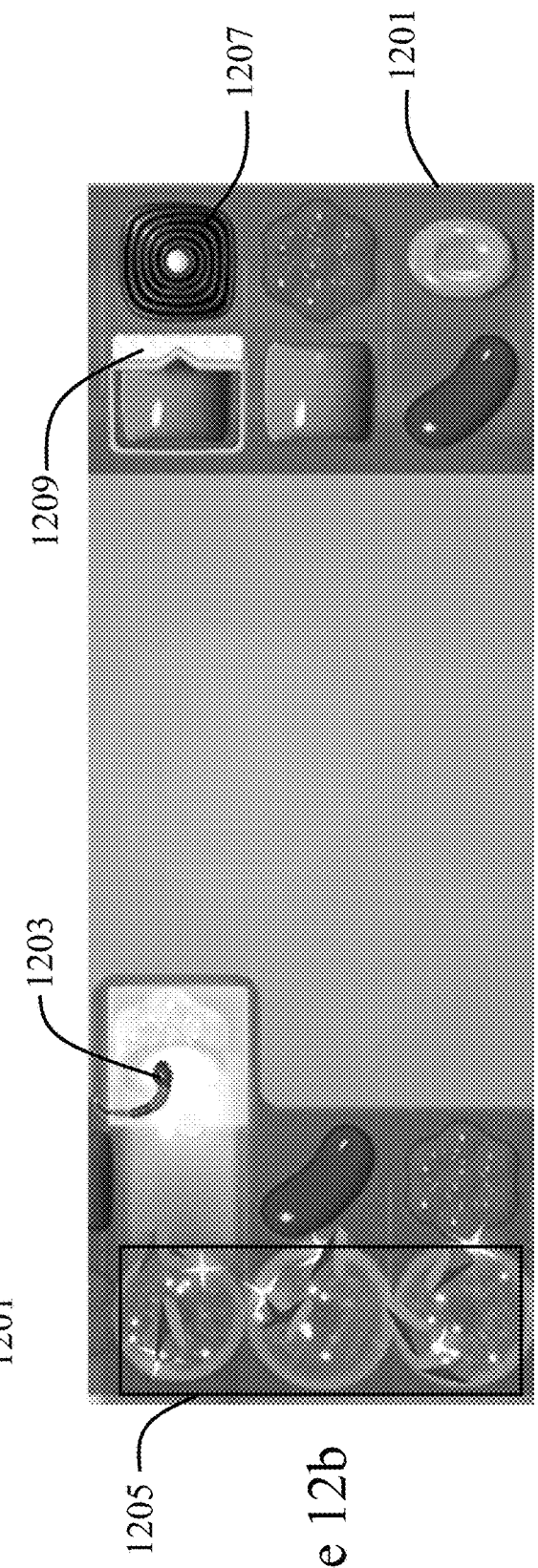
FIG. 12b shows the same exemplary gameboard as in FIG. 12a, wherein the basher element has been activated by satisfaction of a basher layer removal condition and has generated a tile where previously a void was located.
Figure 12C:
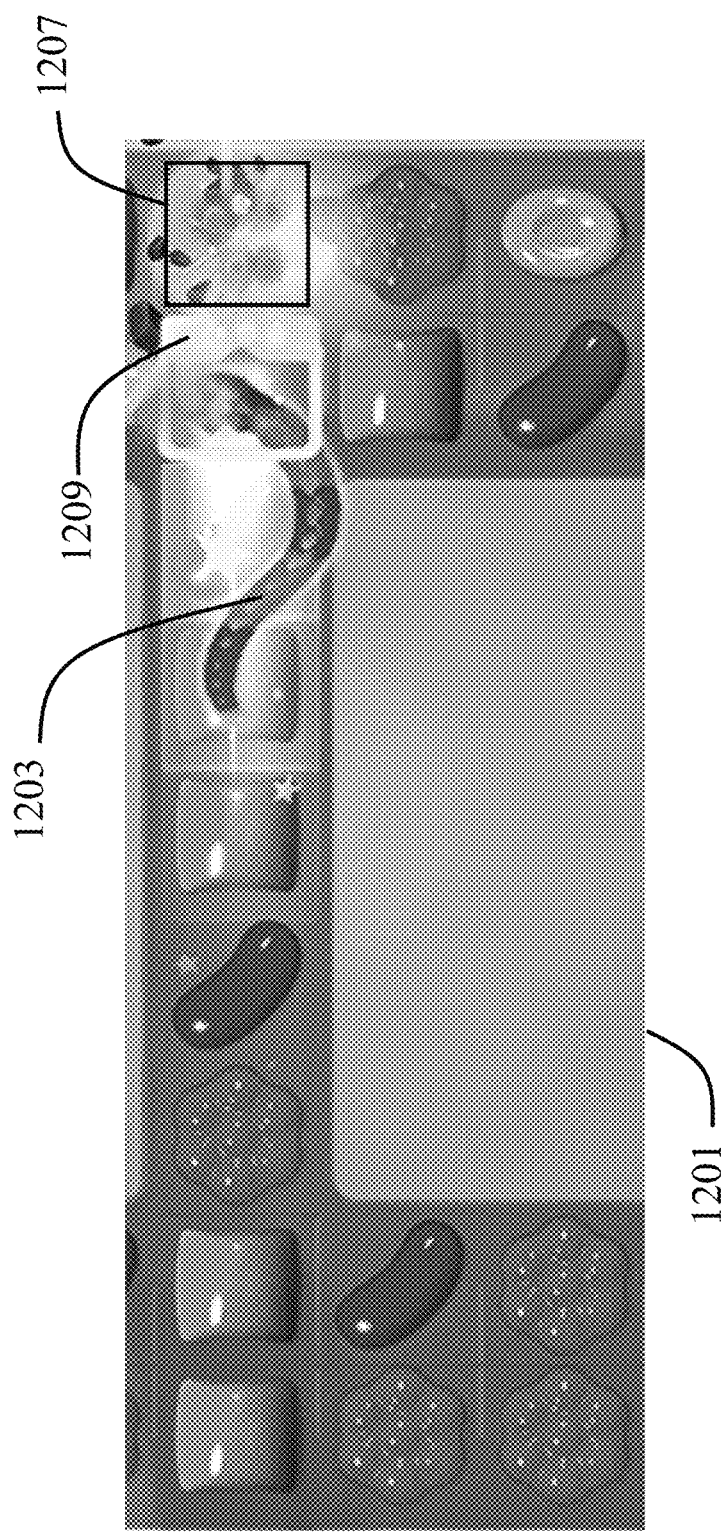
FIG. 12c shows the same exemplary gameboard as in FIG. 12b, wherein the basher element has travelled to its corresponding basher stopper and caused generation of new tiles and an impact effect.

FIGS. 12a, 12b and 12c show three views of an exemplary portion of a gameboard 1201 in the game Candy Crush, rendered on a display of a computer device. FIG. 12a shows a basher element 1203 in a horizontal orientation, the basher element comprising one basher layer and having a corresponding basher stopper 1209. In the example of FIG. 12a, the gameboard 1201 includes a region of empty gameboard locations, which are rendered to show a background; the empty gameboard locations do not have a tile texture and do not comprise a game element. FIG. 12a further shows a special element 1207 which is comprised within a tile that immediately follows the basher stopper 1209 in the direction of travel of the basher element 1203.

FIG. 12b shows the same exemplary portion of a gameboard 1201 as in FIG. 12a. FIG. 12b shows a match of three gameboard elements 1205, wherein one element in the match 1205 is located in a tile adjacent to the basher element 1203. A snapshot of an animation wherein the matched elements are removed is shown, as is a snapshot of an animation wherein the final layer is removed from the basher element 1203, and the basher element 1203 is triggered.

FIG. 12c shows the same exemplary gameboard portion 1201 as in Figures Da and db, wherein the elements matched in match 1205 have been removed from the gameboard, and the refill mechanism has refilled the tiles which comprised the matched elements. In FIG. 12c, the basher element 1203 is shown to be travelling to its corresponding basher stopper 1209 via the empty gameboard locations. In this example, five new tiles are created in the empty gameboard locations through which the triggered basher element 1203 travels, with game elements being spawned in the new tiles; this demonstrates an embodiment of the creation effect as described previously herein. FIG. 12c further shows the triggered basher element 1203 reaching its corresponding basher stopper 1209. FIG. 12c shows a snapshot of an animation, wherein the basher element 1203 enters the basher stopper 1209 before being removed from the gameboard 1201. FIG. 12c shows an example of the impact effect, wherein the special element 1207 is destroyed by the basher element 1203, though it is not comprised in a tile between the initial tile and stopper tile of the basher element 1203.

Figure 13B:
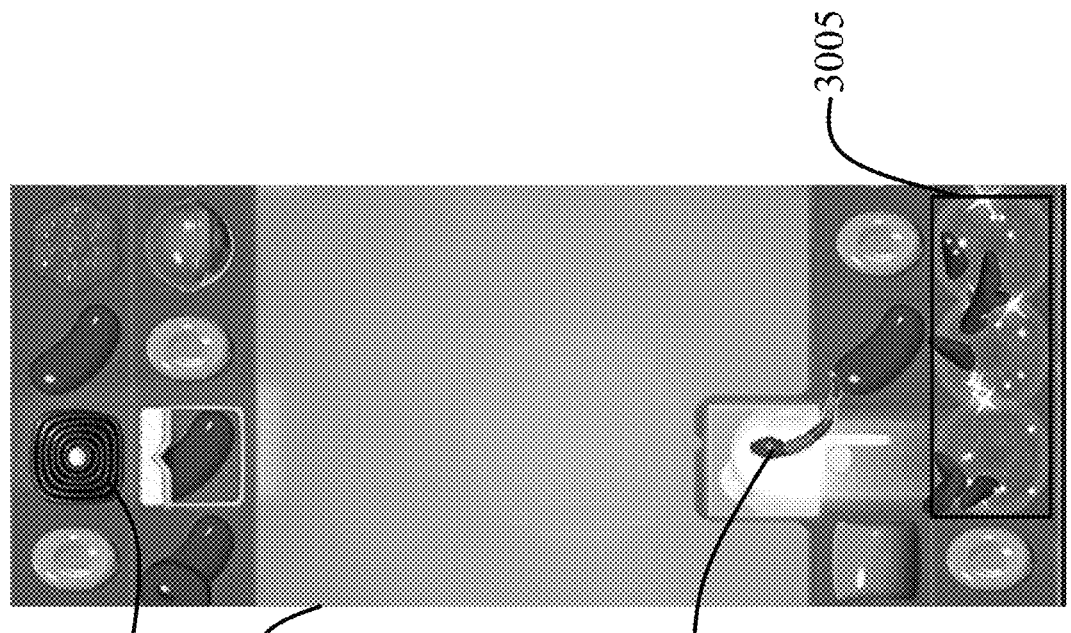
FIG. 13b shows the same exemplary gameboard as in FIG. 13a, wherein the basher element has been activated and has already caused a new tile to be generated.
Figure 13A:
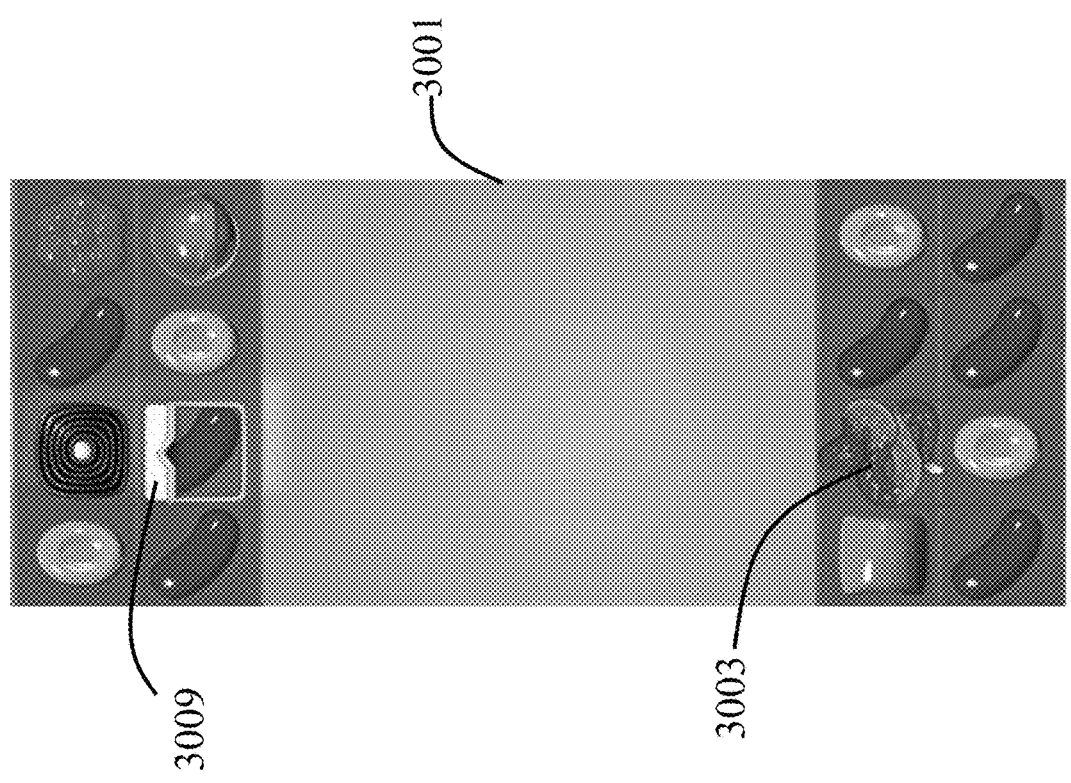
FIG. 13a shows an exemplary gameboard comprising a basher element in a vertical orientation, the basher element having one remaining layer.

FIGS. 13a, 13b, 13c and 13d show four views of an exemplary gameboard 3001 rendered on a display device, demonstrating a further example of the tile creation effect and impact effect. FIG. 13a shows an exemplary gameboard 3001 comprising a basher element 3003 in a vertical orientation, the basher element 3003 comprising one remaining layer. FIG. 13a further shows a basher stopper 3009 corresponding to the basher element 3003, and a special game element 3007 comprised in a tile that immediately follows the stopper tile in the direction of travel of the basher element. FIG. 13b shows the same exemplary gameboard 3001 as in FIG. 13a, wherein a match of three elements 3005 is made, one element in the match 3005 being located in a tile that is adjacent to the basher element 3003; the match satisfies a basher element layer removal condition. FIG. 13b shows a snapshot of an animation in which the elements in the match 3005 are removed from the gameboard. Also shown is a snapshot of an animation in which the basher element 3003 is triggered and begins to travel to the tile comprising its corresponding basher stopper 3009.

Figure 13D:
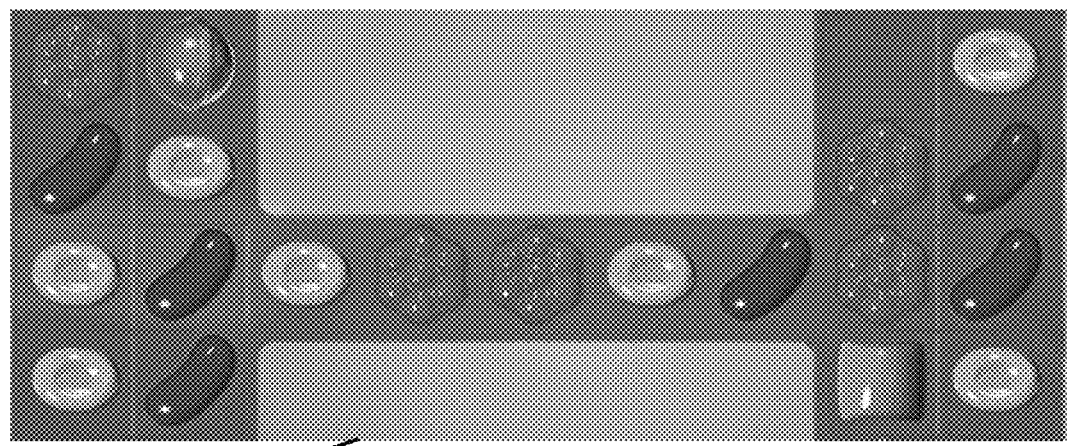
FIG. 13d shows the same exemplary gameboard as in FIG. 13c, wherein the basher element and corresponding basher stopper are removed from the gameboard.
Figure 13C:
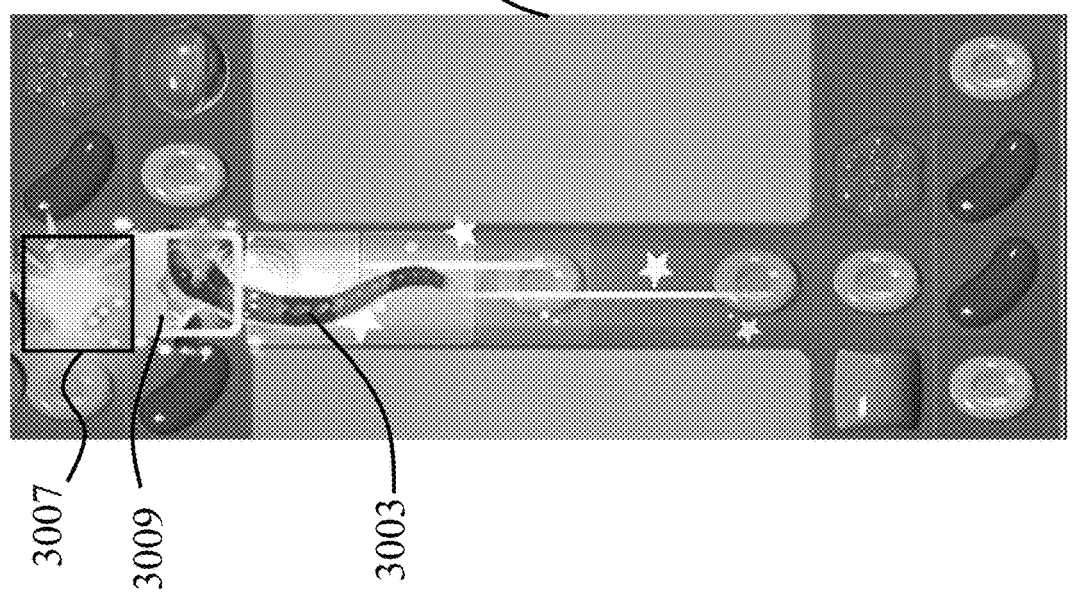
FIG. 13c shows the same exemplary gameboard as in FIG. 13b, wherein the basher element has travelled to its corresponding basher stopper and caused generation of new tiles and an impact effect.

FIG. 13c shows the triggered basher element 3003 travelling to the tile comprising its corresponding basher stopper 3009, via the region of empty gameboard locations. As the basher element 3003 travels, new tiles are created in the empty gameboard locations, with game elements being spawned in the new tiles. FIG. 13d shows the exemplary gameboard after the basher element 3003 reaches the basher stopper 3009 and is removed from the gameboard. The tiles created by the basher element 3003 comprise game elements that are responsive to user input.

The computer device configured to implement the basher functionality is configured to implement it in a game with a switcher mechanic, which in some embodiments can be a match-3 switcher mechanic. The ideas explained may also be implemented for games with other mechanics. Features of one example of a switcher mechanic are laid out below.
Match 3 Switcher Game The following description describes additional game components of match 3 switcher games. The person skilled in the art will understand that there are many other ways the present ideas can be implemented, and the description is not limited to only one implementation. The following features can be used in combination with any of the aforesaid novel device features or game components.

Glossary/Terms

Game board: The area where the matching and swapping of elements occur: Note that the entire game board is not visible to a player but can be scrolled to change the player view.

Game elements: All elements that appear on the game board.

Standard game elements: These are the six basic candies used for making switches and colour matches on the game board. Compared to special game elements, the standard game elements have no extra properties or behaviour, they are only used to make colour combinations or to create new special game elements.

Ingredients: Game elements that are included in levels where one of the goals to complete the level is to bring down ingredient elements to the bottom of the game board.

Jelly block: A game element that is placed underneath other game elements and need one or two matches on top of them to disappear.

Special game elements: All elements that appear on the game board and which have specific behaviours and properties.

Striped candy: A special candy with a line blast effect which means it removes one row or one column.

Line blast: An effect which removes one row or one column.

Moves & Score Level: In this game mode you have a limited number of switches before running out of moves. If you have not reached the score required to earn at least 1 Star, then you will fail the level.

Jelly Level: In this game mode the game board behind the candy is covered in jelly. Remove the jelly by matching candy on top of the jelly. If you fail to remove all jelly before running out of moves then you will fail the level.

Ingredients Level: In this game mode, ingredients will appear on the game board. Collect these ingredients by bringing them to their delivery point. On the side of the board you will see a recipe of how many ingredients you need to collect. If you do not bring down all the ingredients before running out of moves then you will fail the level.

Time Limited Level: In this game mode there is a time limit. If you have not reached the score required to earn at least 1 Star when the time runs out, then you will fail the level.

Candy Order level: In this game mode, you are tasked with collecting a number of candies. This is done by removing the wanted candies. If you have not collected all the wanted candies before running out of moves, then you will fail the level.

Bomb element: a candy in wrapped paper which removes candies in a 3×3 square area.

Wrapped candy: a candy in wrapped paper which removes candies in a 3×3 square area.

Colour Bomb: Removes all candies of the colour it is being swapped with.

Booster: Something that enhances the gameplay and that supports, assists, or increases power or effectiveness.

Blocker: Blocking game elements that are unswappable, need 1 or more matches next to them to disappear or may be removed by triggered special game elements and are in the way for falling candies.

Candy Crush Saga™ by the games developer King™ is a game belonging to the match-3 category of games. The game has more than 350 different levels and not all of those levels have the same requirements to be completed. Simply matching three or more game elements is not enough to complete all levels in the game but the player has to meet certain goals as well. These goals could be to reach a certain amount of points before running out of moves or time; to bring down certain game elements to the bottom of the screen; to remove a certain amount of game elements before running out of moves or to collect certain game elements through specific matches before running out of moves.

If the game becomes difficult there are boosters to help the player pass a level. These can be obtained from in-game purchases or received as gifts from friends connected through a social network. The game may also include activation components such as those described herein to allow a user to more easily receive boosters in-game.

The game also has a candy land themed map view. The map view shows what levels have been completed as well as how many levels are left to play. Throughout the game and for each level completed, the player journeys across the map and follows the story of a girl who is journeying through the candy land. The map is also divided into different areas where each area has its own candy theme as well as a small story connected to that area.

Rules

In some implementations additional moves can be earned by good gameplay.

The game board may be a scrolling game board. The display displays a grid of square tiles, each with a game element, showing the whole or a portion of the level being played.

Different Goals to Complete Levels

To add more diversity and make Candy Crush Saga™ a more dynamic game, players have to fulfil different criteria in order to complete different levels; these are referred to as goals. Each level always has one or more goals that have to be fulfilled in order to complete that level.

Reach a Set Score Before Running Out of Moves

One of Candy Crush Saga's most common goals is to collect a certain amount of points before running out of moves. The points are collected through making matching combinations on the game board. The smarter combinations made, the more points. Points collected in-game may also contribute to other features of the game.

Reach a Set Score Before Running Out of Time

Candy Crush Saga also has timed levels. The goal that needs to be fulfilled on these levels is to collect a certain amount of points before time runs out. The smarter combinations made, the more points.

Bring Down Ingredients

Some levels are referred to as Ingredients levels. The Ingredients levels have two goals which need to be fulfilled in order to complete the level:

The player has to reach a certain target score before running out of moves.

The player has to bring down a certain number of so-called ingredients to the bottom of the game board before running out of moves. When the ingredients reach the bottom of the game board they disappear and candies above them take their place. Ingredients are game elements shaped as fruits or nuts and only exist for this specific goal. They are not matchable with other game elements, but they can be switched with other game elements.

Clear Jelly

One of the most frequent set of goals in Candy Crush Saga is the one used for levels that contain Jelly blocks. Jelly blocks are game elements that are found underneath other game elements and need one or two matches on top of them to disappear (See description elsewhere). The goals that need to be fulfilled on levels with Jelly blocks are:

Reach target score before running out of moves (as described elsewhere)

Remove all jelly blocks before running out of moves

Collect Certain Elements

Another type of level Candy Crush Saga has introduced to their variety of game modes is a so-called Order level. Order levels have two goals:

Reach target score before running out of moves (as described elsewhere).

Collect certain amount of candies through specific matches as well as achieving hard to make combos specified on the level played.

Balance Mode

In this game mode, players are required to collect an even amount of two colours of candies to complete the level. The level goal can be indicated with a scale where the two different types of candies to be collected are placed on either side. When the count is unbalanced, one side of a scale starts tipping, the bigger the difference the faster it tips. If one end touches bottom level has failed. Score is given to the player based on the number of moves it takes to collect the required amount of the two colours.

Crescendo Mode

The goal of this game mode is to light up all squares/cells on the game board. In some implementations, the requirement to light up a cell is to combine a candy that is in that cell. In other implementations, the player has to combine multiple candies in the same cell before it lights up.

Digging Mode

In this game mode, players are required to combine candies in cells adjacent to blockers in order to 'dig' down in the level. When digging, the player can uncover objects that are covered initially.

Multiple Game Modes

All of the game modes described herein can also be used in any combination with one another. For instance, the requirement to complete one level could be to remove all jelly as well as bringing down ingredients.

Basic Rules

How to Play

If the player tries to make a move with two candies in such a way that no candy will be matched with at least two more of its own colour, then the move will not be allowed and the player will have to try to find another move.

If no moves are possible on the game board then all the candies are reshuffled so that there will always be at least one possible move available. If the player can't see or find a move to make, then the game helps the player by giving a hint. The hint is displayed after a few seconds of inactivity and is shown by brightening and magnifying the candies of a possible move in a flashing animation.

Advanced Rule

Not only the match of 3 candies is allowed but matches of more candies can also be done; Matches with more than 3 candies give more points and is something the player should try and aim for. Different acceptable matches are:

Match of 3 in a line.

Match of four in a vertical line.

Match of four in a horizontal line.

Match of four in a 2×2 square.

Match of five in a vertical line.

Match of five in a horizontal line.

Match of five in a T-shape.

Match of five in an L-shape.

Match of 6 or more candies in a combination of 4-in-a-row, 5-in-a-row, T- and L-shapes.

As can be noticed from the list of possible matches, no diagonal matches are accepted. Diagonal matches and/or swaps can be allowed in some implementations of the game.

Combos to Receive Special Elements

Matches made of four or more candies not only give more points but also reward the player with special game elements. The special game elements received from combos have various positive properties and can be used to gain more points and to easier pass a level. The elements received from different matches are:

- 4-in-a-row: Striped candy—striped candies remove a whole row or column (including any blockers) if matched with two or more candies of the same type.
- 4 in a 2×2 block: Fish—Fish are triggered in a match condition. When triggered, they "swim" to a random candy and remove it.
- L- or T-shape: Wrapped candy—when triggered in a match, wrapped candies trigger two extensions in a cascade, removing candies in a 3×3 square around the wrapped candy.
- 5-in-a-row: Colour bomb—colour bombs are triggered if swapped with any candy—no match-3 is necessary. When a colour bomb is triggered it removes all candies of the same colour as the candy that was used to trigger it.

If a match is made with more than 6 candies, then it is likely that the combo is a shape merged from 4-in-a-row, 5-in-a-row, L-shape and T-shape. If so, there is a hierarchy of what kind of special element is received:

- If there is a merge of 4-in-a-row and an L- or T-shape, then the special game element received will be the same as from an L- or T-shape. L- and T-shapes give the same special game element.
- If there is a merge of 5-in-a-row and an L- or T-shape, then the special game element received will be the same as from a 5-in-a-row combo.

How to Trigger Special Elements

To use the special game elements received from combos there are two different ways:

- Some of the special game elements are triggered through a standard match with two or more candies of the same colour as the special game element.
- Some of the special game elements are triggered by swapping place with any candy regardless if a match-3 is made.

Combining Special Elements with Each Other

Special game elements received from matches, can be combined with each other for various positive effects affecting the game board. Striped candies, Wrapped candies and Colour bombs can all be matched with each other. To trigger these combos, they do not need to be matched by game elements of the same colour but can simply be swapped with each other for an instant trigger.

Points

The points given for different combinations and removals of blocks are:

- 3-in-a-row: 60 points
- 4-in-a-row: 120 points
- 5-in-a-row: 200 points
- T-shape: 200 points
- L-shape: 200 points
- Break a Jelly block: 1000 points
- Break a Frosting block: 20 points/per block
- Break a Chocolate block: 20 points/per block
- Get an ingredient to the bottom of the screen: 10 000 points
- Using a special game element to remove other game elements: 60 points/per element removed Game Elements Standard Game Elements In Candy Crush Saga there are 6 standard game elements which all look like candies:

- Purple candy in the shape of a flower
- Blue candy in the shape of a sphere
- Green candy in the shape of a square block
- Red candy in the shape of a tilted bean
- Yellow candy in the shape of a drop
- Orange candy in the shape of an oval Special Game Elements Special game elements can either be received from special combos or from an automatic placement on the game board.

It will be appreciated that, whilst specific embodiments of the invention have been described, these are not exhaustive. The scope of the invention is not defined by the described embodiment but only by the appendant claims.

The invention claimed is:

1. A computer device configured to provide a game to a user, the computer device having:
   a user interface comprising a display and configured to provide on the display a gameboard comprising gameboard locations, at least a first set of the gameboard locations comprising tiles supporting game objects, wherein at least some of the game objects are user selectable game elements of differing characteristics and wherein at least one of the gameboard locations defines a void at which no tile is located, wherein the void does not support a game element,
   the user interface configured to detect user input when a user engages with one of the user selectable game elements; and
   a processor configured to receive a detected user input with one of the user selectable game elements and detect a qualifying match game condition of a plurality of adjacent user selectable game elements having matching characteristics, and configured to remove the plurality of user selectable game elements of the qualifying match game condition when a qualifying match game condition is detected and to generate new user selectable game elements to replenish the gameboard;
   wherein at least one tile of the gameboard supports a special game element, and
   wherein the processor is further configured to detect a special game element triggering condition and on detection of the special game element triggering condition to trigger the special game element to cause it to move to a target gameboard location, to detect that there is no tile at the target gameboard location and to generate a new tile on the gameboard at the target gameboard location.

2. The computer device of claim 1 wherein the target gameboard location is the gameboard location adjacent the tile supporting the special game element.

3. The computer device of claim 1 wherein the processor is configured to cause the special game element to move to another gameboard location, to detect that a tile at the other gameboard location supports a user selectable game element and to remove that user selectable game element from the tile at the other gameboard location.

4. The computer device of claim 1 wherein at least one tile of the gameboard supports a stopper element and wherein the processor is configured to detect that the special game element has reached the tile supporting the stopper element and to prevent the special game element from moving to another gameboard location.

5. The computer device of claim 4 wherein the processor is configured to remove the special game element from the gameboard when it is detected that the special game element is located at the tile supporting the stopper element.

6. The computer device of claim 4 wherein the processor is configured to remove the stopper element from the gameboard when it is detected that the special game element has reached the tile supporting the stopper.

7. The computer device of claim 1 wherein the processor is configured to generate a dynamic visualisation when the special game element moves from its supporting tile to the target gameboard location.

8. The computer device of claim 1 wherein the processor is configured to detect the special game element triggering condition when a qualifying match game condition is detected in which any of the tiles supporting the user selectable game elements of the qualifying match condition are adjacent the tile supporting the special game element.

9. The computer device according to claim 1 wherein the processor is configured to detect the special element triggering condition when a booster element support by a tile on the gameboard activated by the user input engages with the special game element.

10. The computer device of claim 1 wherein the special game element comprises multiple layers and wherein the processor is configured to remove one of the multiple layers on detection of a special game element layer removal condition.

11. The computer device of claim 10 wherein the processor is configured to detect the special game element triggering condition when all layers of the multiple layers of the special game element have been removed.

12. The computer device of claim 4 wherein the tile supporting the stopper further supports a user selectable game element.

13. The computer device of claim 4 wherein the tile supporting the stopper further supports a selectable game element.

14. The computer device of claim 1 comprising computer memory holding a data structure which identifies gameboard locations without tiles and which, for each tile, indicates a tile attribute defining the user selectable game object supported by that tile.

15. The computer device of claim 14 wherein the processor is configured to update the data structure to add the generated new tile with a corresponding tile attribute.

16. The computer device of claim 4 wherein the processor is configured to generate an impact effect on detection that the special game element has reached the tile supporting the stopper, the impact effect removing a user selectable game element from at least one target tile associated with the impact effect.

17. The computer device of claim 3 wherein the processor is configured to remove a blocker game element from the tile at other gameboard location.

18. The computer device of claim 14 wherein the data structure defines a path for movement of the special game element.

19. A method of controlling a computer device responsive to user input, the method comprising:
providing on a display of the computer device a gameboard comprising gameboard locations, at least a first set of the gameboard locations comprising tiles supporting game objects, wherein at least some of the game objects are user selectable game elements of differing characteristics, wherein at least one of the gameboard locations defines a void at which no tile is located, wherein the void does not support a game element, and wherein at least one tile of the gameboard supports a special game element;
detecting user input when a user engages with one of the user selectable game elements; and
receiving a detected user input with one of the user selectable game elements and detecting a qualifying match game condition of a plurality of adjacent user selectable game elements having matching characteristics, removing the plurality of user selectable game elements of the qualifying match game condition when a qualifying match game condition is detected and generating new user selectable game elements to replenish the gameboard;
the method further comprising detecting a special game element triggering condition and on detection of the special game element triggering condition to trigger the special game element to cause it to move to a target gameboard location, detecting that there is no tile at the target gameboard location and generating a new tile on the gameboard at the target gameboard location.

20. A non-transitory computer readable media on which are stored computer readable instructions which when executed by a processor of a computer device cause the processor to implement the method of claim 19.

* * * * *